(12) United States Patent
Yoshida

(10) Patent No.: US 12,373,067 B2
(45) Date of Patent: Jul. 29, 2025

(54) DISPLAY DEVICE WITH POSITION INPUT FUNCTION

(71) Applicant: SHARP KABUSHIKI KAISHA, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/586,546

(22) Filed: Feb. 26, 2024

(65) Prior Publication Data
US 2024/0192812 A1   Jun. 13, 2024

Related U.S. Application Data

(63) Continuation of application No. 17/517,160, filed on Nov. 2, 2021, now Pat. No. 11,947,760, which is a (Continued)

(30) Foreign Application Priority Data

May 9, 2017   (JP) .................................. 2017-092925

(51) Int. Cl.
  *G06F 3/044*   (2006.01)
  *G06F 3/041*   (2006.01)
(52) U.S. Cl.
  CPC .......... *G06F 3/0443* (2019.05); *G06F 3/0412* (2013.01); *G06F 2203/04107* (2013.01)
(58) Field of Classification Search
  CPC ............................................ G06F 2203/04107
  See application file for complete search history.

(56) References Cited

U.S. PATENT DOCUMENTS 8,970,537 B1   3/2015 Shepelev et al.
9,230,497 B2 *   1/2016 Tanaka ................. G09G 3/3659
(Continued)

FOREIGN PATENT DOCUMENTS

WO   2016/136272 A1   9/2016

OTHER PUBLICATIONS

Election/Restriction Requirement of U.S. Appl. No. 16/611,103 issued on Oct. 20, 2020.
(Continued)

*Primary Examiner* — William Boddie
*Assistant Examiner* — Bipin Gyawali
(74) *Attorney, Agent, or Firm* — ScienBiziP, P.C.

(57) ABSTRACT

A display device with a position input function includes a pixel electrode, a common electrode, position detection electrodes, a position detection line, a pixel connection line, and a shield electrode. The common electrode is overlapped with the pixel electrode on an upper layer side or a lower layer side. The position detection electrodes are formed by dividing the common electrode by a partition opening and form a capacitance with a position input body and detect an input position. The position detection line is arranged on an upper layer side or a lower layer side with the common electrode and connected to the position detection electrode. The pixel connection line extends in parallel with the partition opening and is connected to the pixel electrode. The shield electrode extends overlapping with the partition opening and is on a same layer as the position detection line and connected to the position detection line.

14 Claims, 18 Drawing Sheets

Related U.S. Application Data continuation of application No. 16/611,103, filed as application No. PCT/JP2018/017148 on Apr. 27, 2018, now Pat. No. 11,199,934.

(56) References Cited

U.S. PATENT DOCUMENTS

| | | |
|---|---|---|
| 2010/0194697 A1 | 8/2010 | Hotelling et al. |
| 2012/0319966 A1 | 12/2012 | Reynolds |
| 2014/0247239 A1 | 9/2014 | Jamshidi-Roudbari et al. |
| 2016/0253024 A1 | 9/2016 | Aoyama et al. |
| 2017/0102597 A1* | 4/2017 | Seki ................. G02F 1/133308 |
| 2020/0159354 A1* | 5/2020 | Yoshida ................ G06F 3/0443 |
| 2021/0173506 A1* | 6/2021 | Yoshida ................ G06F 3/0446 |

OTHER PUBLICATIONS

Non-Final Office Action of U.S. Appl. No. 16/611,103 issued on Mar. 1, 2021.
Notice of Allowance of U.S. Appl. No. 16/611,103 issued on Aug. 13, 2021.
Notice of Allowance of U.S. Appl. No. 17/517,160 issued on Dec. 6, 2023.

\* cited by examiner

DISPLAY DEVICE WITH POSITION INPUT FUNCTION

CROSS-REFERENCE TO RELATED APPLICATIONS

This application is a continuation of U.S. patent application Ser. No. 17/517,160 filed on Nov. 2, 2021, which is a continuation of U.S. patent application Ser. No. 16/611,103, filed on Nov. 5, 2019, which is the National Stage of International Application No. PCT/JP2018/017148 filed on Apr. 27, 2018, which claims priority from Japanese Patent Application No. 2017-092925 filed on May 9, 2017. The entire contents of the above-identified application are hereby incorporated by reference.

TECHNICAL FIELD

The present invention relates to a display device with a position input function.

BACKGROUND ART

Conventionally, as an example of a liquid crystal display device in which a touch panel function is configured in an in-cell type, there has been known the liquid crystal display device described in the following Patent Document 1. The liquid crystal display device described in Patent Document 1 includes gate signal lines, data signal lines, sensor electrode lines, pixel electrodes divided into groups, and common electrodes arranged in one ratio with respect to the pixel electrodes included in one group, in which the sensor electrode lines are arranged on the same layer as the data signal lines, each of the common electrodes overlaps with the sensor electrode lines in a plan view and is electrically connected to at least one of the sensor electrode lines, and an insulating film of at least one layer is formed between the data signal lines and the sensor electrode lines, between the sensor electrode lines and the common electrodes, and between the common electrodes and the pixel electrodes.

RELATED ART DOCUMENT

Patent Document

Patent Document 1: WO 2016/136272

PROBLEM TO BE SOLVED BY THE INVENTION

In the liquid crystal display device described in Patent Document 1 described above, shield lines are arranged on the insulating film so as to cover a gap between the adjacent sensor electrodes to prevent display quality from deteriorating due to an image disturbance caused by a leakage electric field. However, in order to form the shield line, it is necessary to add a process of forming a conductive film and patterning the conductive film to a manufacturing process, which causes the problem in that manufacturing costs increase.

DISCLOSURE OF THE PRESENT INVENTION

The present invention has been completed based on the above-described circumstances, and an object of the present invention is to reduce manufacturing costs while suppressing deterioration in display quality.

Means for Solving the Problem

A display device with a position input function according to the present invention includes: a pixel electrode; a common electrode arranged such that at least a portion thereof overlaps the pixel electrode from an upper layer side or a lower layer side; position detection electrodes defined by dividing the common electrode by a partition opening, the position detection electrodes and a position input body performing a position input creating a capacitance therebetween, and the plurality of position detection electrodes detecting an input position input by the position input body; a position detection line arranged on an upper layer side or a lower layer side with respect to the common electrode and connected to the position detection electrode; a pixel connection line extending in parallel to the partition opening and connected to the pixel electrode; and a shield electrode extending such that at least a portion thereof overlaps the partition opening, the shield electrode arranged in a same layer as the position detection line and connected to the position detection line.

According to to such a configuration, a potential difference based on the voltage supplied to the pixel electrode is generated between the pixel electrode and the common electrode at least partially overlapping with the pixel electrode on the upper layer side or the lower layer side with respect to the pixel electrode, and the display is made using the potential difference. The pixel connection line is connected to the pixel electrode. On the other hand, the position detection line arranged on the upper layer side or the lower side with respect to the common electrode is connected to the position detection electrode formed by dividing the common electrode by the partition opening. On the other hand, the position detection electrode can form the capacitance with the position input body performing the position input to detect the input position by the position input body using a signal supplied by the position detection line.

Here, since the pixel connection line extends in parallel with the partition opening that divides the common electrode and partitions between adjacent position detection electrodes, if an electric field is generated between the pixel connection line and the end portion of the position detection electrode on the partition opening side, the display quality may deteriorate due to the electric field near the end portion of the position detection electrode on the partition opening side. In this regard, since the shield electrode which extends at least partially overlapping with the partition opening and is connected to the position detection line is provided, the electric field near the end portion of the position detection electrode on the partition opening side is weakened by the shield electrode. Accordingly, the deterioration in the display quality due to the electric field near the end portion of the position detection electrode on the partition opening side is suppressed. In addition, since the shield electrode is arranged on the same layer as the position detection line, a dedicated manufacturing process for forming the shield electrode becomes unnecessary. As a result, it is suitable to reduce the manufacturing costs.

Advantageous Effect of the Invention

According to the present invention, it is possible to reduce the manufacturing costs while suppressing the deterioration in the display quality.

MODES FOR CARRYING OUT THE INVENTION

First Embodiment

A first embodiment of the present invention will be described with reference to FIGS. 1 to 9. In the present embodiment, a liquid crystal display device (display device with a position input function) 10 having a touch panel function (position input function) is exemplified. Note that an X axis, a Y axis, and a Z axis are illustrated in a part of each drawing, and each axis direction is drawn to be a direction illustrated in each drawing. In addition, an upper side in FIGS. 4, 6, 7, 9 and the like is a front side, and a lower side in FIGS. 4, 6, 7, 9 is a back side.

Figure 1:
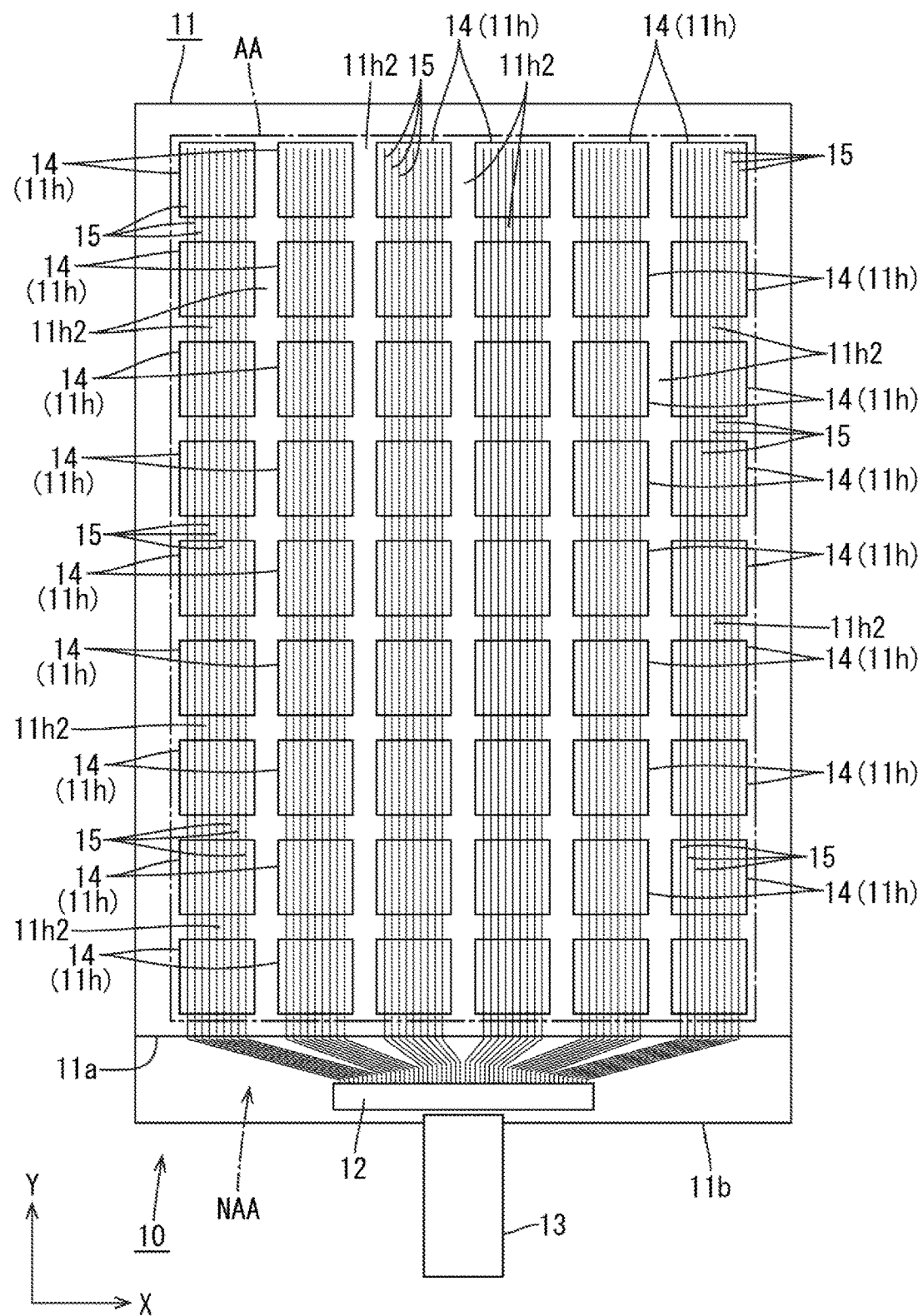
FIG. 1 is a plan view illustrating a plane arrangement of position detection electrodes and position detection lines of a liquid crystal panel provided in a liquid crystal display device according to a first embodiment of the present invention.

The liquid crystal display device 10 includes at least a liquid crystal panel (display panel) 11 that can display an image, and a backlight device (lighting device) which is an external light source that irradiates the liquid crystal panel 11 with light for being used for display, as illustrated in FIG. 1. The backlight device is disposed on a back side (back surface side) with respect to the liquid crystal panel 11 and includes a light source (for example, a light emitting diode (LED)) that emits white light, an optical member that converts the light from the light source into planar light by imparting an optical action to the light from the light source, or the like. Note that the illustration of the backlight device is omitted.

As s illustrated in FIG. 1, in the liquid crystal panel 11, a central portion of a screen is a display area (a range surrounded by an alternate long and short dash line in FIG. 1) AA in which an image is displayed, while a frame-like outer peripheral portion surrounding the display area AA on the screen is a non-display area NAA in which the image is not displayed. A driver 12 and a flexible substrate 13 are mounted as components for supplying various signals related to a display function or a touch panel function, in the non-display area NAA of the liquid crystal panel 11. The driver 12 includes a large scale integration (LSI) chip having a driving circuit therein, is mounted in the non-display area NAA of the liquid crystal panel 11 in a chip on glass (COG) manner, and processes various signals transmitted by the flexible substrate 13. The flexible substrate 13 has a structure in which many line patterns (not illustrated) are formed on a substrate formed of a synthetic resin material (for example, a polyimide-based resin) having an insulating property and flexibility, and has one end connected to the non-display area NAA of the liquid crystal panel 11 and the other end connected to a control board (signal supply source) (not illustrated). Various signals supplied from the control board are transmitted to the liquid crystal panel 11 through the flexible substrate 13, are processed by the driver 12 in the non-display area NAA, and are then output to the display area AA.

Figure 4:
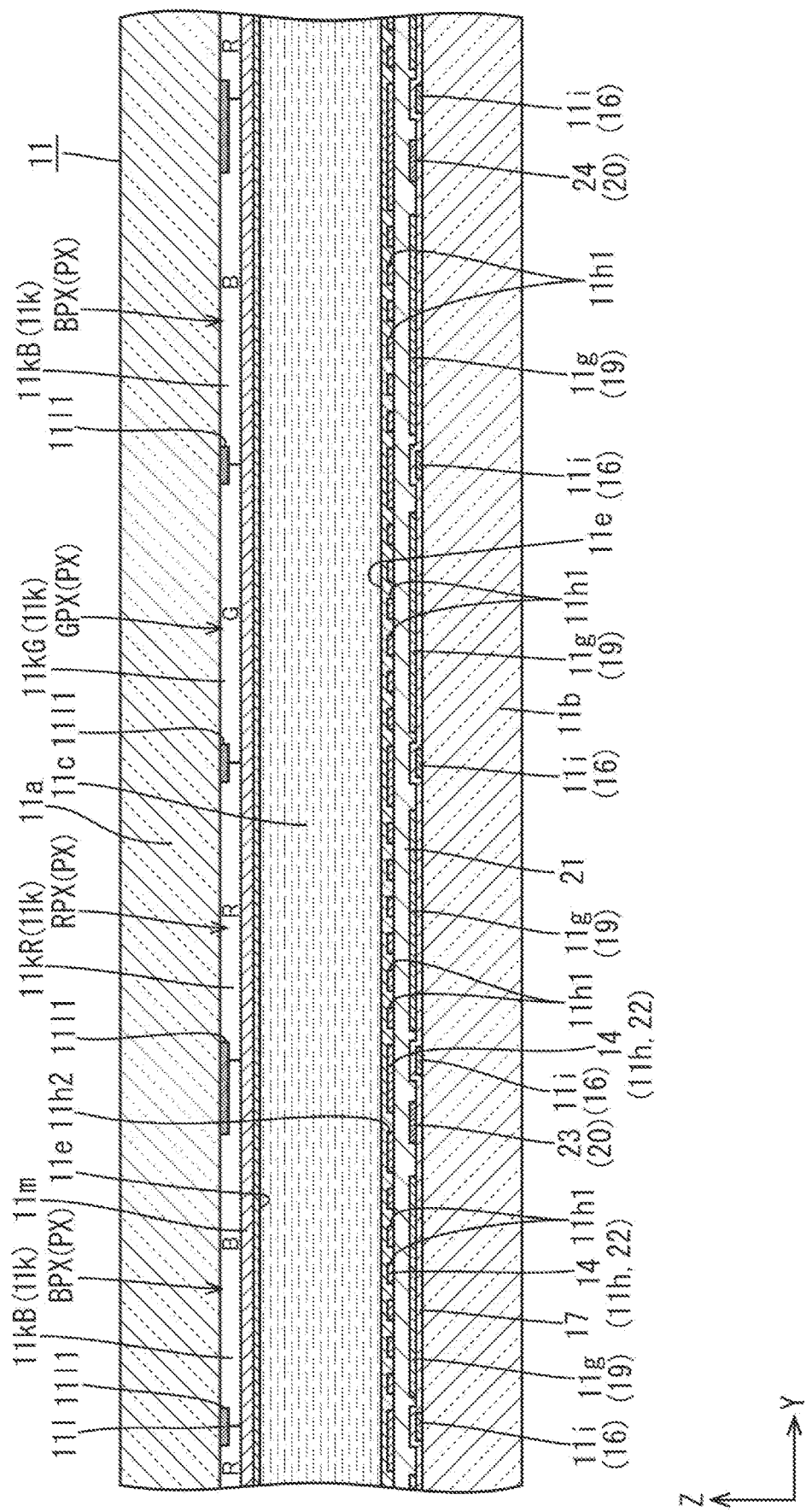
FIG. 4 is a cross-sectional view taken along the line A-A in FIG. 2.

The liquid crystal panel 11 will be described in detail. The liquid crystal panel 11 includes a pair of substrates 11a and 11b and a liquid crystal layer (medium layer) 11c arranged in an internal space between both the substrates 11a and 11b and including liquid crystal molecules which are a material whose optical characteristics are changed as an electric field is applied, as illustrated in FIG. 4, and the liquid crystal layer 11c is surrounded and sealed by a seal portion (not illustrated) interposed between both the substrates 11a and 11b. Of the pair of substrates 11a and 11b, the front side is a color filter (CF) substrate (counter substrate) 11a, and the back side is an array substrate (active matrix substrate, element substrate) 11b. Both of the CF substrate 11a and the array substrate 11b are formed by laminating various films on an inner surface side of a glass substrate formed of glass. Note that polarizing plates (not illustrated) are attached to outer surface sides of both the substrates 11a and 11b, respectively.

Figure 2:
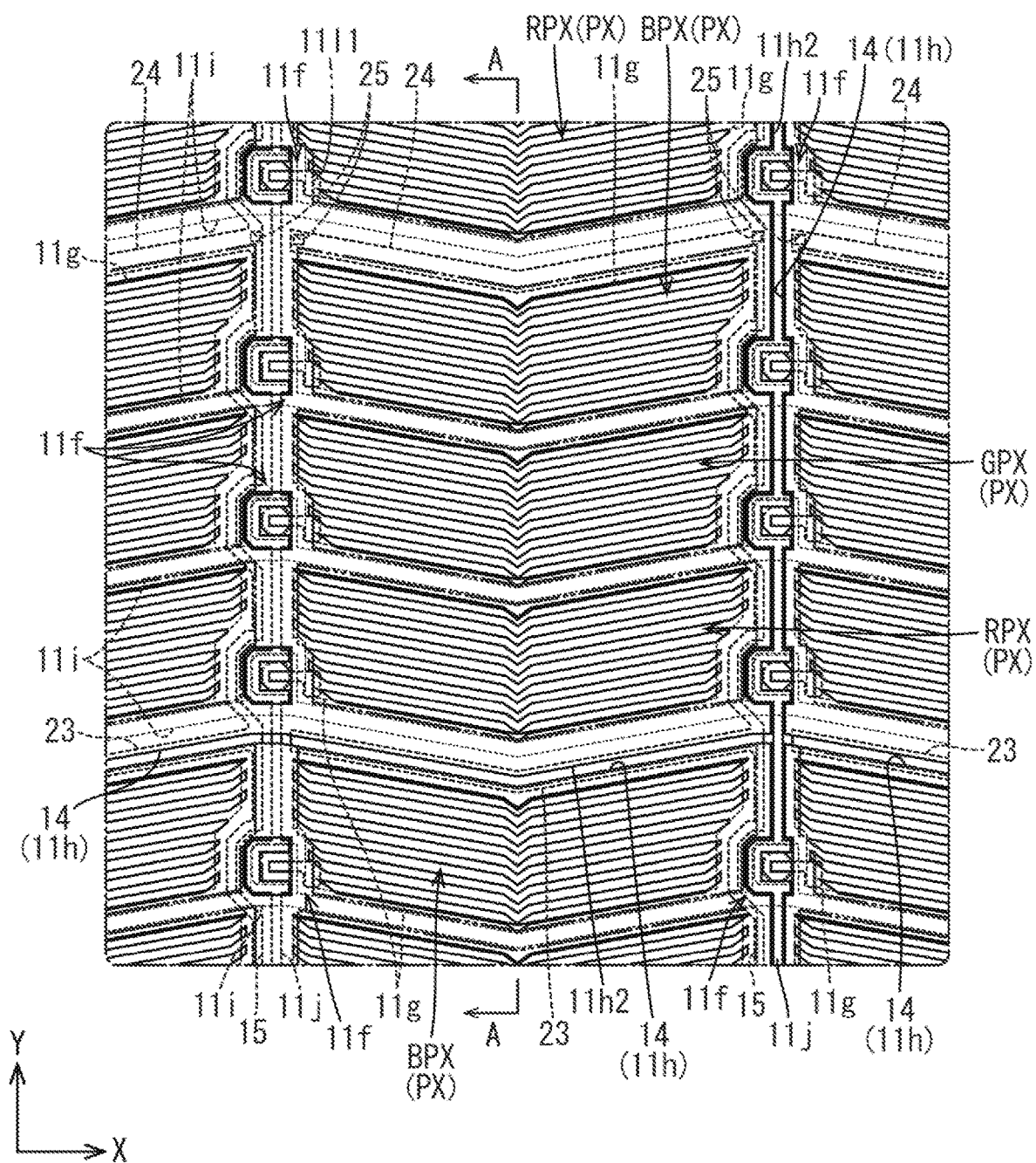
FIG. 2 is a plan view illustrating a pixel arrangement of an array substrate and a color filter (CF) substrate constituting a liquid crystal panel.

As illustrated in FIG. 2, TFTs (thin film transistors, switching elements) 11f and pixel electrodes 11g are provided on the inner surface side (the liquid crystal layer 11c side, the surface side facing the CF substrate 11a) in the display area AA of the array substrate 11b in a matrix shape side by side along the X-axis direction and the Y-axis direction, and gate lines (pixel connection line, scanning line) 11i and source lines (signal line, data line) 11j having a substantial lattice shape are disposed around the TFT 11*f* and the pixel electrode 11*g* so as to surround the TFT 11*f* and the pixel electrode 11*g*. The gate lines 11*i* extend substantially along the X-axis direction, while the source lines 11*j* extend substantially along the Y-axis direction. The gate lines 11*i* and the source lines 11*j* are connected to a gate electrode 11*f*1 and a source electrode 11*f*2 of the TFT 11*f*, respectively, and the pixel electrode 11*g* is connected to a drain electrode 11*f*3 of the TFT 11*f*. The TFT 11*f* is driven on the basis of various signals each supplied to the gate lines 11*i* and the source lines 11*j*, and the supply of a potential to the pixel electrode 11*g* is controlled according to the driving of the TFT 11*f*. The pixel electrode 11*g* has a planar shape that is a substantially horizontally long rectangular shape (longitudinal shape), and at least the gate line 11*i* is interposed between the pixel electrodes 11*g* adjacent a short side direction (Y-axis direction) and at least the source line 11*j* is interposed between the pixel electrodes 11*g* adjacent in a long side direction (X-axis direction). The pixel electrode 11*g* has a long side portion slightly inclined in the X-axis direction and is bent once at a central position thereof, and the gate line 11*i* parallel to the long side portion of the pixel electrode 11*g* is also bent along the long side portion thereof. The source lines 11*j* extend along the short side direction of the horizontally long pixel electrode 11*g* and are arranged side by side at intervals in the long side direction of the pixel electrode 11*g*, and compared with the case where the pixel electrode has a vertically long shape, the arrangement interval of the source lines 11*j* in the X-axis direction is about a ratio (for example, about 1/3) obtained by dividing a short side dimension of the pixel electrode 11*g* by a long side dimension thereof, so that the number of source lines 11*j* installed per unit length in the X-axis direction is about the same ratio (for example, about 1/3) as described above. As a result, the number of source lines 11*j* installed can be reduced, and therefore the number of image signals supplied to the source lines 11*j* is reduced.

As illustrated in FIGS. 2 and 4, on the inner surface side of the display area AA of the array substrate 11*b*, a common electrode 11*h* is formed on an upper layer side (side close to the liquid crystal layer 11*c*) above the pixel electrodes 11*g* to overlap with all the pixel electrodes 11*g*. The common electrode 11*h* is supplied with a substantially constant reference potential and extends over substantially the entire display area AA, and horizontally long pixel overlapping openings (pixel overlapping slits, alignment control slits) 11*h*1 (seven in FIG. 2, but can be changed as appropriate) are formed in a portion overlapping with each pixel electrode 11*g*. The pixel overlapping opening portion 11*h*1 extends along the long side portion (gate line 11*i*) of the pixel electrode 11*g*. When the pixel electrode 11*g* is charged and thus a potential difference is generated between the pixel electrode 11*g* and the common electrode 11*h* that overlap with each other, a fringe electric field (oblique electric field) including a component in a normal direction to a plate surface of the array substrate 11*b* in addition to a component along the plate surface of the array substrate 11*b* is generated between an opening edge of the pixel overlapping opening 11*h*1 and the pixel electrode 11*g*, and an alignment state of the liquid crystal molecules included in the liquid crystal layer 11*c* can thus be controlled using the fringe electric field. That is, an operation mode of the liquid crystal panel 11 according to the present embodiment is a fringe field switching (FFS) mode.

Figure 3:
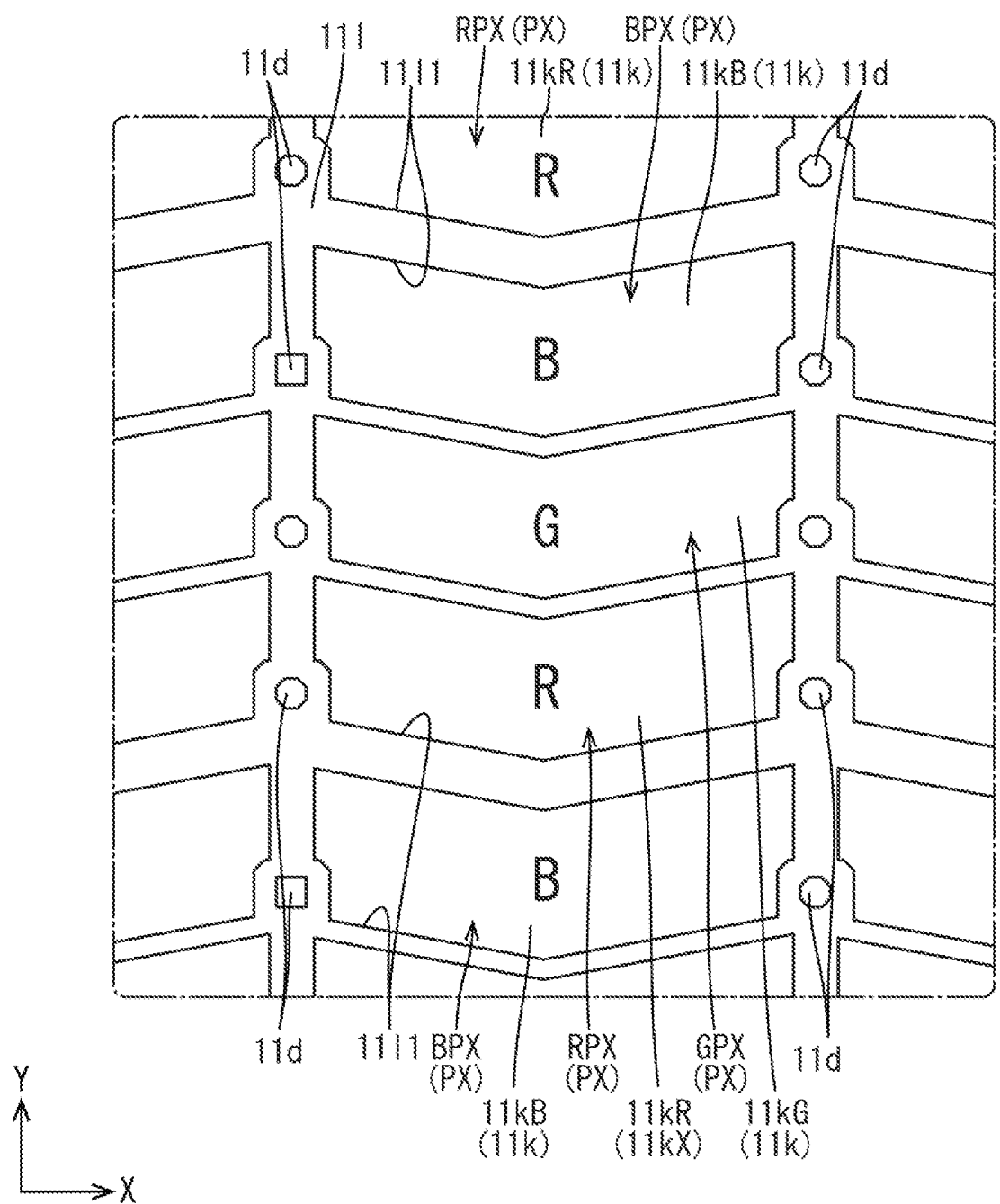
FIG. 3 is a plan view illustrating the pixel arrangement of the CF substrate constituting the liquid crystal panel.

As illustrated in FIGS. 3 and 4, three color filters 11*k* are provided in the display area AA on the inner surface side of the CF substrate 11*a*. A color filter 11*k* includes a red color filter (red colored portion) 11*k*R that exhibits red (R), a green color filter (green colored portion) 11*k*G that exhibits green (G), and a blue color filter (blue colored portion) 11*k*B that exhibits blue (B). The color filters 11*k* exhibiting different colors are repeatedly arranged along the source lines 11*j* (Y-axis direction), and extend along the gate lines 11*i* (X-axis direction), so that the color filters 11*k* are arranged in a substantial stripe shape as a whole. These color filters 11*k* are arranged to overlap with the respective pixel electrodes 11*g* on a side close to the array substrate 11*b* in a plan view. The color filters 11*k* adjacent in the Y-axis direction and exhibiting the different colors are arranged such that a boundary (color boundary) therebetween overlaps with the gate line 11*i* and a light blocking portion 11*l* to be described below. In the liquid crystal panel 11, the color filter 11*k* and the pixel electrode 11*g* facing the color filter 11*k* constitute a pixel unit PX. The pixel unit PX includes a red pixel unit RPX composed of a red color filter 11*k*R and a pixel electrode 11*g* opposed thereto, a green pixel unit GPX composed of a green color filter 11*k*G and the pixel electrode 11*g* opposed thereto, and a blue pixel unit BPX composed of a blue color filter 11*k*B and the pixel electrode 11*g* opposed thereto. In the liquid crystal panel 11, display pixels configured to display a color having a predetermined gradation are configured by the three-color pixel units RPX, GPX, and BPX of R, G, and B adjacent along the Y-axis direction. As will be described in detail later, an arrangement pitch in the Y-axis direction in the pixel unit PX is, for example, about 65 μm to 80 μm.

As illustrated in FIGS. 3 and 4, a light blocking portion (inter-pixel light blocking portion or black matrix) 11*l* blocking light is formed in the display area AA on the inner surface side of the CF substrate 11*a*. The light blocking portion 11*l* has a planar shape that is a substantial lattice shape so as to partition between adjacent pixel units PX (pixel electrodes 11*g*), and includes pixel openings 11*l*1 at positions overlapping most of the pixel electrodes 11*g* on a side close to the array substrate 11*b* in a plan view. The pixel openings 11*l*1 are arranged in a matrix shape along the X-axis direction and the Y-axis direction in the plate surface of the CF substrate 11*a*. The pixel opening portion 11*l*1 has a planar shape that is a substantially horizontally long rectangular shape along an outer shape of the pixel electrode 11*g*. The pixel opening 11*l*1 can transmit light, so that display on the pixel unit PX becomes possible. The light blocking portion 11*l* serves to prevent light from passing between the adjacent pixel units PX to ensure independence of gradations of each pixel unit and particularly a portion of the light blocking portion 11*l* extending along the gate line 11*i* prevents color mixture between the pixel units PX exhibiting the different colors. The light blocking portion 11*l* is disposed to overlap with the gate line 11*i* and the source line 11*j* on the array substrate 11*b* side in a plan view. In addition, a spacer 11*d* is disposed to overlap with the light blocking portion 11*l*, and the interval (the thickness of the liquid crystal layer 11*c*) provided between both the substrates 11*a* and 11*b* can be kept constant by the spacer 11*d*. Alignment films 11*e* for aligning liquid crystal molecules included in the liquid crystal layer 11*c* are each formed on the innermost surface in contact with the liquid crystal layer 11*c* of both the substrates 11*a* and 11*b*. Further, a planarizing film 11*m* is formed to be interposed between the alignment film 11*e* and the color filter 11*k*.

The liquid crystal panel 11 according to the present embodiment has both of a display function for displaying an image and a touch panel function (position input function) for detecting a position (input position) input by a user on the basis of the displayed image, and a touch panel pattern for exerting the touch panel function of these functions is integrated (configured in an in-cell type) within the liquid crystal panel 11. The touch panel pattern is configured in a so-called projection-type capacitive manner, and a detection manner of the touch panel pattern is a self-capacitance manner. As illustrated in FIG. 1, the touch panel pattern is provided on the array substrate 11b of the pair of substrates 11a and 11b, and includes touch electrodes (position detection electrodes) 14 arranged side by side in a matrix shape within the plate surface of the array substrate 11b. The touch electrodes 14 are arranged in the display area AA of the array substrate 11b. Therefore, the display area AA in the liquid crystal panel 11 substantially coincides with a touch area (position input area) in which the input position can be detected, and the non-display area NAA in the liquid crystal panel 11 substantially coincides with a non-touch area (non-position input area) in which the input position cannot be detected. When the user brings his/her finger (position input body) (not illustrated), which is a conductor, close to a front surface (display surface) of the liquid crystal panel 11 in order to perform position input on the basis of an image of the display area AA of the liquid crystal panel 11 visually recognized by him/her, a capacitance is formed between the finger and the touch electrode 14. Thus, as the finger becomes close to the touch electrode 14, a capacitance detected by a touch electrode 14 close to the finger is changed to be different from that of a touch electrode 14 distant from the finger, and it is thus possible to detect the input position on the basis of such a difference.

The touch electrodes 14 are constituted by the common electrode 11h provided on the array substrate 11b, as illustrated in FIG. 1. The common electrode 11h includes a partition opening (partition slit) 11h2 partitioning between adjacent touch electrodes 14, in addition to the pixel overlapping openings 11h1 described above. The partition opening 11h2 includes a portion traversing the entire length of the common electrode 11h substantially along the X-axis direction and a portion traversing the entire length of the common electrode 11h substantially along the Y-axis direction to have a substantial lattice shape as a whole in a plan view. The common electrode 11h is divided in a substantial grid pattern in a plan view by the partition opening 11h2, and thus the touch electrodes 14 are electrically independent from each other. The touch electrodes 14 formed by dividing the common electrode 11h by the partition opening 11h2 are arranged side by side in a matrix shape along the X-axis direction and the Y-axis direction in the display area AA. The touch electrode 14 has a rectangular shape in a plan view, and a dimension of one side of the touch electrode 14 is about several mm (for example, about 2 to 4 mm). Therefore, a size of the touch electrode 14 in a plan view is much larger than that of the pixel unit PX (pixel electrode 11g), so that the touch electrode 14 is arranged in a range over multiple (for example, about several tens or several hundreds of) pixel units PX in the X-axis direction and the Y-axis direction. Touch lines (position detection lines) 15 provided on the array substrate 11b are selectively connected to the touch electrodes 14. The touch lines 15 extend substantially along the Y-axis direction in parallel with the source line 11j on the array substrate 11b, and are selectively connected to a specific touch electrode 14 among the touch electrodes 14 arranged along the Y-axis direction. Further, the touch lines 15 are connected to a detection circuit (not illustrated). The detection circuit may be provided in the driver 12, but may be provided outside the liquid crystal panel 11 through the flexible substrate 13. The touch lines 15 supply a reference potential signal related to a display function and a touch signal (position detection signal) related to a touch function to the touch electrodes 14 at different timings. The reference potential signal of these signals is transmitted to all the touch lines 15 at the same timing, so that all the touch electrodes 14 become a reference potential to function as the common electrode 11h. Note that FIG. 1 schematically illustrates an arrangement of the touch electrodes 14, and the specific number and an arrangement of touch electrodes 14 installed can be appropriately changed in addition to those illustrated.

Figure 6:
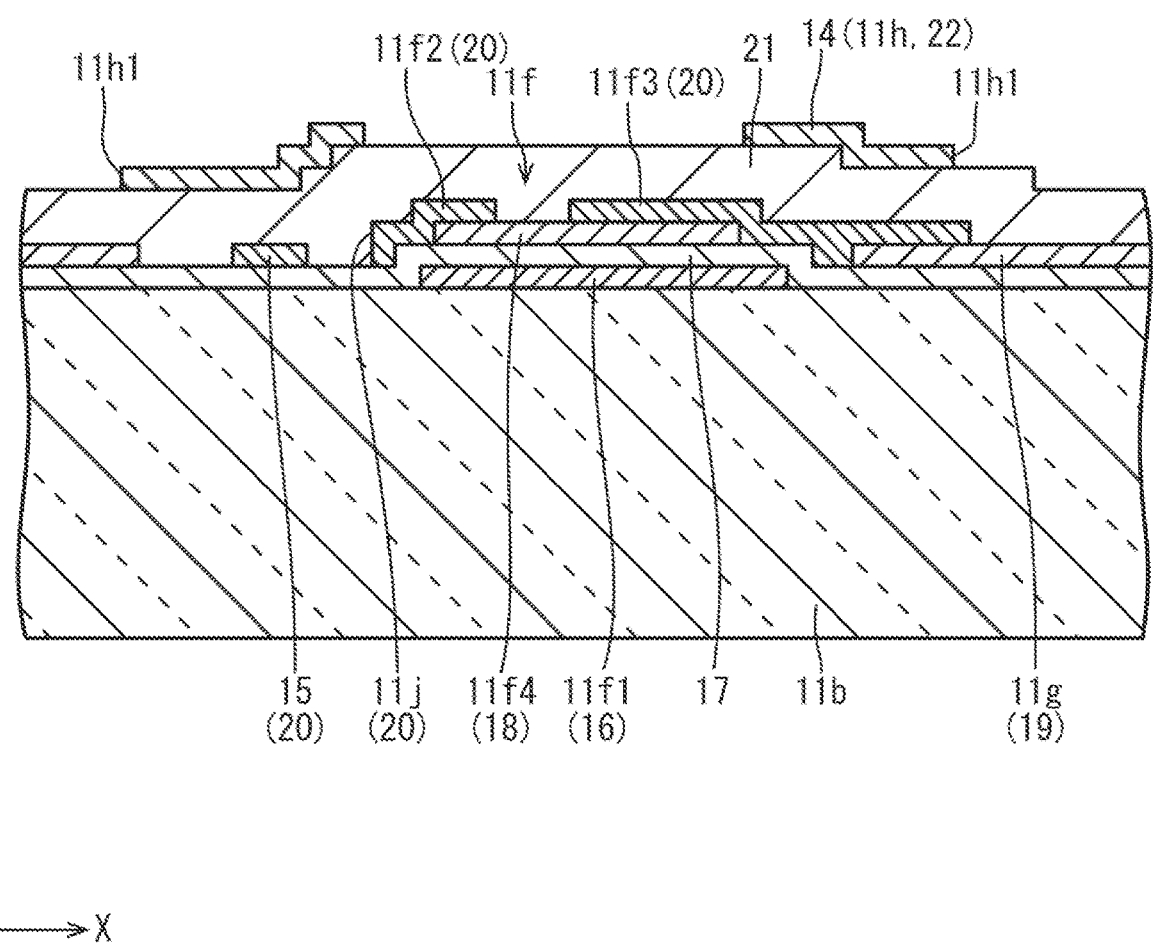
FIG. 6 is a cross-sectional view of the array substrate illustrated in FIG. 5 taken along line B-B.

Here, various films stacked on the inner surface side of the array substrate 11b will be described. As illustrated in FIG. 6, a first metal film (first conductive film) 16, a gate insulating film 17, a semiconductor film 18, a first transparent electrode film 19, and a second metal film (second conductive film) 20, an interlayer insulating film (insulating film) 21, and a second transparent electrode film 22 are stacked on the array substrate 11b in order from a lower layer side thereof. The first metal film 16 is composed of a single layer film formed of one kind of metal materials selected from Al, Cr, Mo, Ti, W, and the like or a stacked film or an alloy formed of different kinds of metal materials to have conductivity and light a blocking property, and constitutes the gate line 11i, the gate electrode 11f1 of the TFT 11f, or the like. The gate insulating film 17 is formed of inorganic materials such as silicon nitride ($SiN_x$) or silicon oxide ($SiO_2$), and keeps the first metal film 16 on a lower layer side thereof, the semiconductor film 18 on an upper layer side thereof, the first transparent electrode film 19, and the second metal film 20 insulated. The semiconductor film 18 is composed of a thin film using, for example, an oxide semiconductor, amorphous silicon or the like as a material, and constitutes a channel portion (semiconductor portion) 11f4 connected to the source electrode 11f2 and the drain electrode 11f3 in the TFT 11f. The first transparent electrode film 19 is formed of a transparent electrode material (for example, indium tin oxide (ITO) or indium zinc oxide (IZO)), and constitutes the pixel electrode 11g and the like. Like the first metal film 16, the second metal film 20 is composed of a single layer film or a stacked film or alloy formed of one or more kinds of metal materials to have conductivity and a light blocking property, and constitutes the source line 11j, the touch line 15, the source electrode 11f2 and the drain electrode 11f3 of the TFT 11f, and the like. Like the gate insulating film 17, the interlayer insulating film 21 is formed of an inorganic material, and keeps the semiconductor film 18, the first transparent electrode film 19 and the second metal film 20 on a lower layer side thereof and the second transparent electrode film 22 on an upper layer side thereof insulated. Like the first transparent electrode film 19, the second transparent electrode film 22 is made of a transparent electrode material, and constitutes the common electrode 11h (touch electrode 14) and the like.

Figure 5:
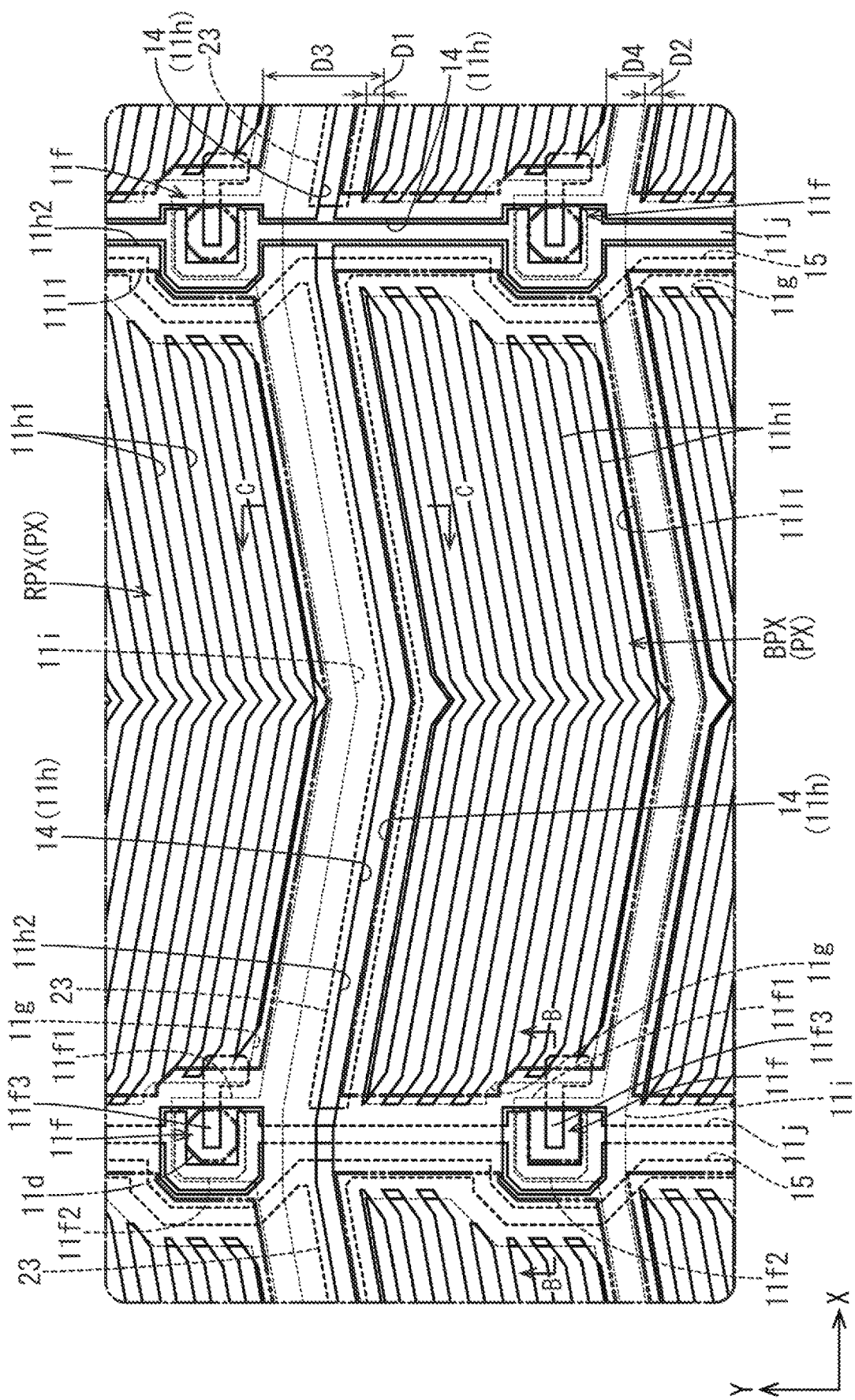
FIG. 5 is an enlarged plan view of the vicinity of the shield electrode on the array substrate and the CF substrate.

The configuration of the TFT 11f will be described in detail. As illustrated in FIGS. 5 and 6, the TFT 11f includes the gate electrode 11f1 branched from the gate line 11i. The gate electrode 11f1 is formed by protruding a portion intersecting the source line 11j in the gate line 11i toward the pixel electrode 11g, which is a connection target, along the Y-axis direction, and has a substantially rectangular shape in a plan view. The gate electrode 11f1 drives the TFT 11f based on a scanning signal supplied to the gate line 11i, thereby controlling a current between the source electrode 11f2 and the drain electrode 11f3. The TFT 11f includes the source electrode 11f2 composed of a portion overlapping with the gate electrode 11f1 in the source line 11j. The source line 11j has a channel type in which the intersecting portion with the gate line 11*i* is bent along three sides of the gate electrode 11*f*1 and opened toward the pixel electrode 11*g* side in a plan view, and constitutes the source electrode 11*f*2. The TFT 11*f* includes the drain electrode 11*f*3 arranged at a position spaced apart from the source electrode 11*f*2. The drain electrode 11*f*3 is opposed to three side portions of the source electrode 11*f*2, and extends from the opening of the source electrode 11*f*2 along the X-axis direction such that an end portion thereof is connected to the pixel electrode 11*g*. The TFT 11*f* includes a channel portion 11*f*4 which overlaps with the gate electrode 11*f*1 through the gate insulating film 17 and is connected to the source electrode 11*f*2 and the drain electrode 11*f*3. Like the gate electrode 11*f*1, the channel portion 11*f*4 has a planar shape that is a rectangle, and three side portions thereof are connected to the source electrode 11*f*2 and the portion including the remaining one side portion is connected to the drain electrode 11*f*3. Then, when the TFT 11*f* is turned on based on the scanning signal supplied to the gate electrode 11*f*1, an image signal (signal, data signal) supplied to the source line 11*j* is supplied from the source electrode 11*f*2 to the drain electrode 11*f*3 through the channel portion 11*f*4 composed of the semiconductor film 18, so that the pixel electrode 11*g* is charged.

Next, a configuration of the touch line 15 will be described. As illustrated in FIGS. 5 and 6, the touch line 15 is composed of the same second metal film 20 as the source line 11*j*, and is stacked on the upper layer side of the gate insulating film 17 like the first transparent electrode film 19. That is, the touch lines 15 are arranged on the same layer as the pixel electrode 11*g* composed of the source line 11*j* and the first transparent electrode film 19 and are each arranged at intervals in the X-axis direction with respect thereto, so that a short circuit is avoided. Further, the touch line 15 composed of the second metal film 20 having a light blocking property is arranged not to overlap with the pixel electrode 11*g*, thereby avoiding an aperture ratio of the pixel unit PX from being lowered in vain. The touch line 15 is arranged adjacent to the source line 11*j* at intervals on the opposite side to the pixel electrode 11*g* side on which the source line 11*j* is electrically connected to the source line 11*j* through the TFT 11*f*. The touch line 15 is arranged at intervals from the source line 11*j* in the X-axis direction, and extends in parallel with the source line 11*j*. Therefore, in the touch line 15, a portion of the touch line 15 adjacent to the source electrode 11*f*2 is bent such that the planar shape thereof is a channel shape. In addition, the touch line 15 has the same line width as that of the source line 11*j*.

As illustrated in FIG. 2, since the gate line 11*i* connected to the pixel electrode 11*g* through the TFT 11*f* extends in parallel with the partition opening 11*h*2 that divides the common electrode 11*h* and partitions adjacent touch electrodes 14, if an electric field is generated between the gate line 11*i* and the end portion of the touch electrode 14 on the partition opening 11*h*2, the alignment state of the liquid crystal molecules in the liquid crystal layer 11*c* is locally disturbed due to the electric field near the end portion of the touch electrode 14 on the partition opening 11*h*2, so that the display quality is likely to deteriorate.

Figure 7:
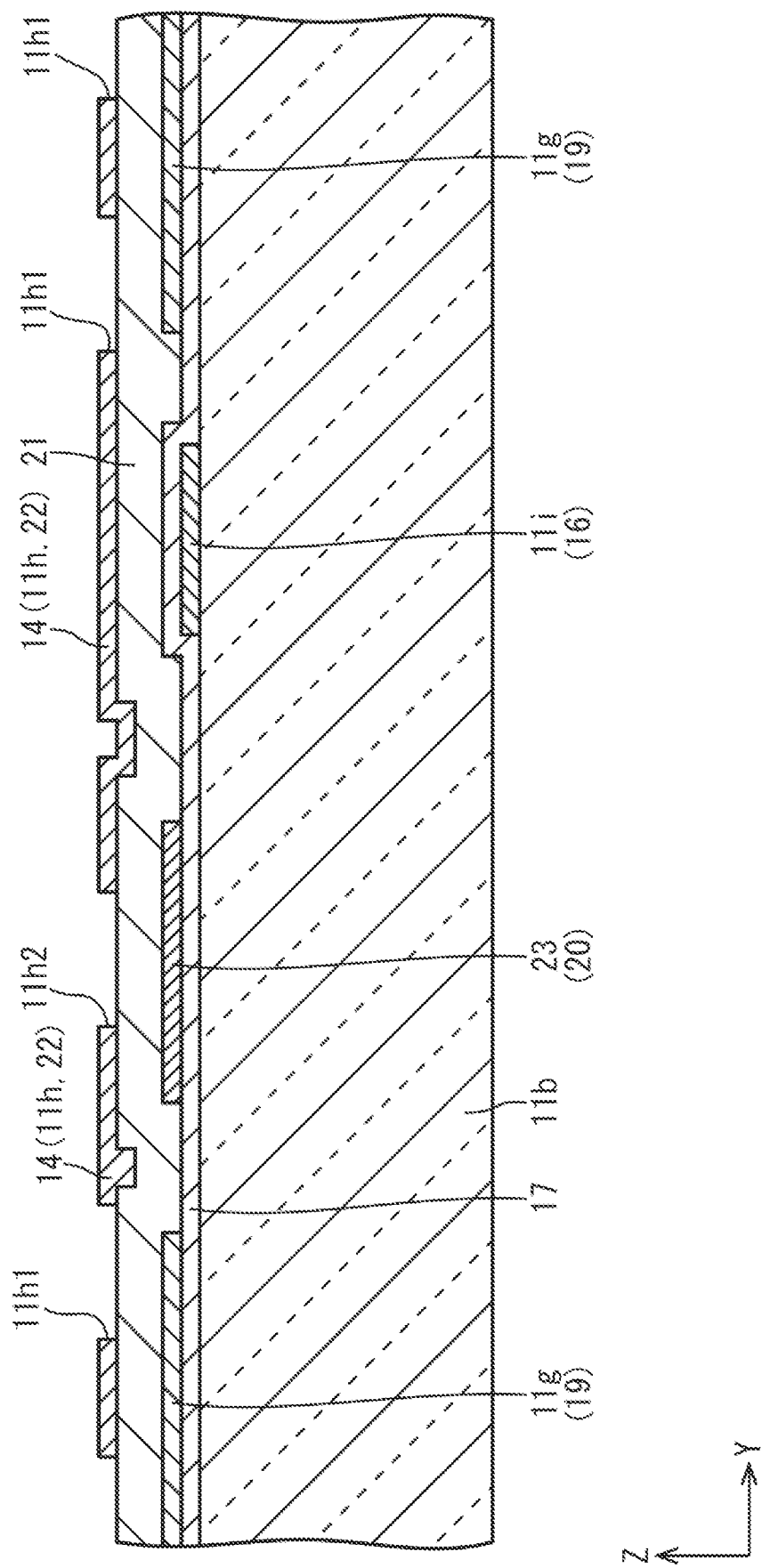
FIG. 7 is a cross-sectional view of the array substrate illustrated in FIG. 5 taken along line C-C.

Therefore, as illustrated in FIGS. 5 and 7, the array substrate 11*b* according to the present embodiment is provided with the shield electrode 23 that extends so as to at least partially overlap with the partition opening 11*h*2. The shield electrode 23 is arranged on the same layer as the touch line 15 by being composed of the same second metal film 20 as the touch line 15 in the array substrate 11*b*, and is electrically connected to the touch line 15 composed of the same second metal film 20. In this way, the electric field near the end portion of the touch electrode 14 on the partition opening 11*h*2 is weakened by the shield electrode 23. As a result, the alignment state of the liquid crystal molecules included in the liquid crystal layer 11*c* is hard to be locally disturbed due to the electric field near the end portion of the touch electrode 14 on the partition opening 11*h*2, thereby suppressing deterioration in the display quality. In particular, in the present embodiment, since the pixel electrode 11*g* has a longitudinal shape in which the X-axis direction (the extending direction of the gate line 11*i* and the shield electrode 23) is the long side direction, compared to the case where the pixel electrode 11*g* has the longitudinal shape in which the Y-axis direction (the direction orthogonal to the extending direction of the gate line 11*i* and the shield electrode 23) is the long side direction, the electric field near the end portion of the touch electrode 14 on the partition opening 11*h*2 disturbs the alignment state of the liquid crystal molecules included in the liquid crystal layer 11*c* over a wide range to be more likely to deteriorate the display quality, but the electric field near the end portion of the touch electrode 14 on the partition opening 11*h*2 is suitably weakened by the shield electrode 23 as described above, so that it is possible to suitably suppress the display quality from deteriorating due to the electric field near the end portion of the touch electrode 14 on the partition opening 11*h*2. In addition, since the shield electrode 23 is arranged on the same layer as the touch line 15, the dedicated manufacturing process for forming the shield electrode 23 becomes unnecessary. As a result, it is suitable to reduce the manufacturing costs. Further, the shield electrode 23 is arranged so as to be interposed between the pixel electrode 11*g* and the gate line 11*i* in the Y-axis direction and not to overlap with the pixel electrode 11*g* and the gate line 11*i*, and extends substantially along the X-axis direction so as to be parallel with the long side portion of the pixel electrode 11*g* and the gate line 11*i*, so that a length dimension of the shield electrode 23 substantially matches that of the pixel electrode 11*g*. That is, the shield electrode 23 extends adjacent to the pixel electrode 11*g* over the substantially entire length of the long side portion of the pixel electrode 11*g* adjacent in the Y-axis direction. One end portion (the right side illustrated in FIGS. 2 and 5) of the shield electrode 23 in the extending direction is connected to the touch line 15.

As illustrated in FIG. 7, the shield electrode 23 composed of the second metal film 20 is arranged on the upper layer side of the gate insulating film 17 like the pixel electrode 11*g* composed of the first transparent electrode film 19, so that the shield electrode 23 is arranged on the same layer as the pixel electrode 11*g*. On the other hand, the gate line 11*i* composed of the first metal film 16 is arranged on the lower layer side through the gate insulating film 17 with respect to the shield electrode 23 and the pixel electrode 11*g*. That is, the shield electrode 23 composed of the second metal film 20 is arranged on the lower layer side of the common electrode 11*h* composed of the second transparent electrode film 22 and on the upper layer side of the gate line 11*i* composed of the first metal film 16. Therefore, a relatively strong electric field is generated between the shield electrode 23 and the gate line 11*i* on the lower layer side thereof, so that the electric field generated between the gate line 11*i* and the end portion of the touch electrode 14 on the partition opening 11*h*2 is relatively weakened. As a result, the deterioration in the display quality due to the electric field near the end portion of the touch electrode 14 on the partition opening 11*h*2 is more suitably suppressed.

As illustrated in FIGS. 5 and 7, the gate line 11i and the partition opening 11h2 are arranged not to overlap (offset) with each other in a plan view. In this way, compared to the case in which the gate line is disposed to overlap with the partition opening 11h2, the distance in the Y-axis direction (the arrangement direction of the pixel electrode 11g and the gate line 11i) between the gate line 11i and the end portion of the touch electrode 14 on the partition opening 11h2 is large, so that the electric field generated between the gate line 11i and the end portion of the touch electrode 14 is more weakened. As a result, the deterioration in the display quality due to the electric field near the end portion of the touch electrode 14 on the partition opening 11h2 is more suitably suppressed.

In addition, as illustrated in FIGS. 5 and 7, the shield electrode 23 is selectively arranged adjacent to the opposite side (lower side illustrated in FIG. 5) to the pixel electrode 11g side to which the gate line 11i is connected in the Y-axis direction with respect to the specific gate line 11i included in the gate lines 11i arranged along the Y-axis direction. In this way, the shield electrode 23 is arranged not to be interposed between the gate line 11i and the pixel electrode 11g to which the gate line 11i is connected in the Y-axis direction. Accordingly, the positional relationship in the Y-axis direction between the gate line 11i adjacent to the shield electrode 23 and the pixel electrode 11g to which the gate line 11i is connected is equal to the positional relationship in the Y-axis direction between the gate line 11i not adjacent to the shield electrode 23 and the pixel electrode 11g to which the gate line 11i is connected. As a result, the parasitic capacitance generated between the gate line 11i and the pixel electrode 11g to which the gate line 11i is connected can be equalized, which results in being more suitable for suppressing the display quality from deteriorating.

Furthermore, the shield electrode 23 is arranged such that a distance D1 between the pixel electrodes 11g adjacent in the Y-axis direction is equal to a distance D2 between the gate line 11i that is not adjacent to the shield electrode 23 and the pixel electrode 11g adjacent to the opposite side of the pixel electrode 11g to which the gate line 11i is connected. In this way, the parasitic capacitance generated between the shield electrode 23 and the pixel electrode 11g adjacent to the shield electrode 23 in the Y-axis direction is equalized to the parasitic capacitance generated between the gate line 11i and the pixel electrode 11g. As a result, it is more suitable for suppressing the display quality from deteriorating.

Figure 8:
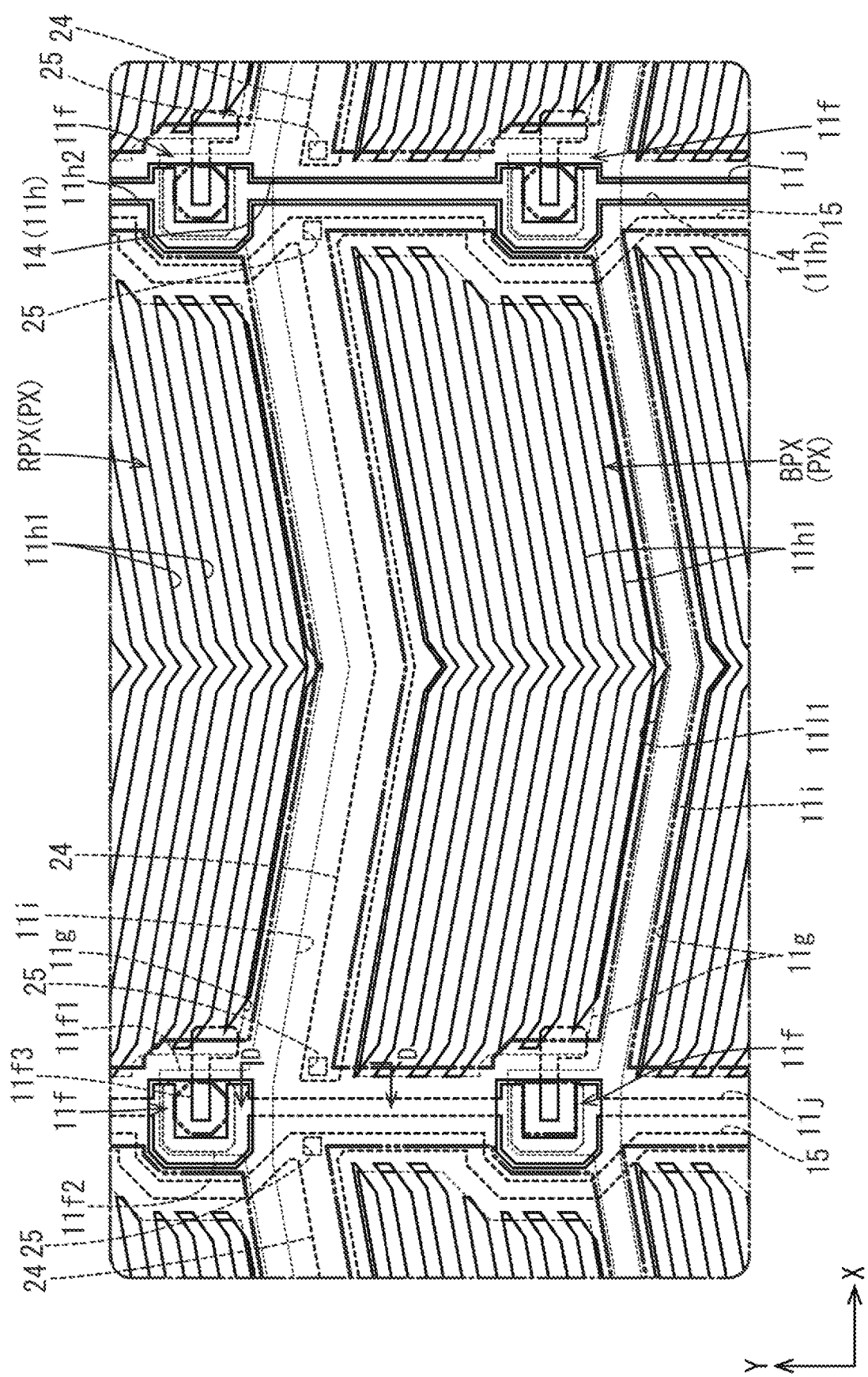
FIG. 8 is an enlarged plan view of the vicinity of the dummy shield electrode on the array substrate and the CF substrate.
Figure 9:
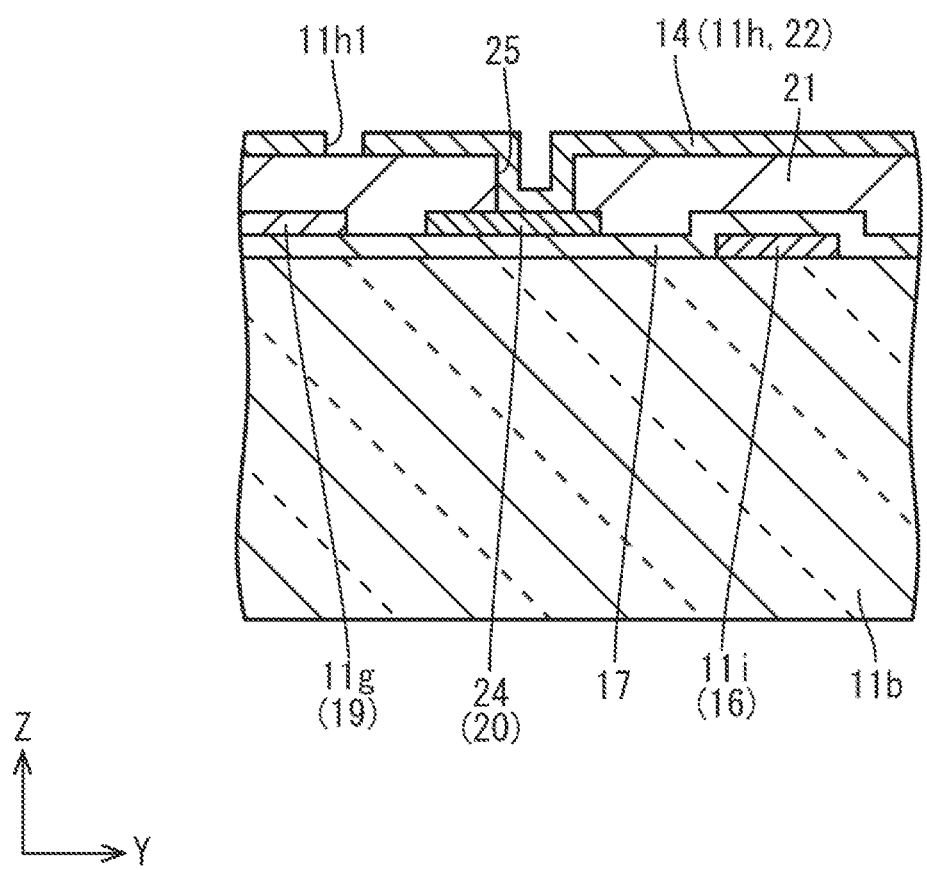
FIG. 9 is a cross-sectional view of the array substrate illustrated in FIG. 8 taken along line D-D.

Here, if it is assumed that the pixel electrode 11g, the gate line 11i, and the shield electrode 23 are each patterned in different manufacturing processes, the positional relationship between the gate line 11i and the shield electrode 23 tends to vary due to a manufacturing error (for example, photomask misalignment, and the like) for the pixel electrode 11g, and the like. In this regard, as illustrated in FIGS. 8 and 9, the array substrate 11b according to the present embodiment is provided with the dummy shield electrode 24 that is arranged adjacent to the gate line 11i and the pixel electrode 11g not to overlap with the partition opening 11h2, and extends in parallel with the shield electrode 23. The dummy shield electrode 24 is arranged on the same layer as the touch line 15 by being composed of the same second metal film 20 as the touch line 15 in the array substrate 11b, and is connected to the touch line 15 composed of the same second metal film 20. In this way, even if the positional relationship in the Y-axis direction of the shield electrode 23 with respect to the pixel electrode 11g varies due to the manufacturing error or the like, the positional relationship of the dummy shield electrode 24 with respect to the pixel electrode 11g in the Y-axis direction also varies. Therefore, the parasitic capacitance related to the pixel electrode 11g adjacent to the dummy shield electrode 24 is equalized to the parasitic capacitance related to the pixel electrode 11g adjacent to the shield electrode 23. As a result, it is more suitable for suppressing the display quality from deteriorating. Further, the dummy shield electrode 24 is arranged so as to be interposed between the pixel electrode 11g and the gate line 11i in the Y-axis direction and not to overlap with the pixel electrode 11g and the gate line 11i, and extends substantially along the X-axis direction so as to be parallel with the long side portion of the pixel electrode 11g and the gate line 11i, so that a length dimension of the dummy shield electrode 24 substantially matches that of the pixel electrode 11g. That is, the dummy shield electrode 24 extends adjacent to the pixel electrode 11g over the substantially entire length of the long side portion of the pixel electrode 11g adjacent in the Y-axis direction. One end portion (the right side illustrated in FIGS. 2 and 8) of the dummy shield electrode 24 in the extending direction is connected to the touch line 15. Accordingly, the shield electrode 23 and the dummy shield electrode 24 arranged at intervals in the Y-axis direction are connected to the same touch line 15.

As illustrated in FIGS. 8 and 9, since the dummy shield electrode 24 is arranged not to overlap the partition opening 11h2 formed in the common electrode 11h, the adjacent touch electrodes 14 are arranged to overlap with the partition opening 11h2 in a plan view. In the interlayer insulating film 21 interposed between the second metal film 20 constituting the dummy shield electrode 24 and the second transparent electrode film 22 constituting the touch electrode 14, contact holes 25 are provided at the position where the touch electrode 14 and the dummy shield electrode 24 overlap with each other in the form in which the contact hole 25 is opened. A pair of contact holes 25 is arranged at positions overlapping with both end portions of the dummy shield electrode 24 in the extending direction. The dummy shield electrode 24 is electrically connected to the touch electrode 14 through the contact hole 25. Since the dummy shield electrode 24 is connected to the touch line 15, the touch electrode 14 and the touch line 15 are electrically connected to each other through the dummy shield electrode 24. In this way, since the touch line 15 and the touch electrode 14 can be connected using the arrangement space of the dummy shield electrode 24, if the touch line is directly connected to the touch electrode 14, compared to the case in which there is a need to secure the arrangement space of the contact hole by partially expanding the touch line with the limited line width, the arrangement efficiency is more preferable.

As illustrated in FIG. 2, the shield electrode 23 and the dummy shield electrode 24 are selectively arranged such that the shield electrode 23 and the dummy shield electrode 24 are each adjacent to the pixel electrodes 11g overlapping with the color filters 11k exhibiting the specific color among the pixel electrodes 11g. In this way, since the shield electrode 23 and the dummy shield electrode 24 are selectively arranged such that the shield electrode 23 and the dummy shield electrode 24 are each adjacent to the pixel electrodes 11g overlapping with the color filters 11k exhibiting a specific color among the pixel electrodes 11g, the parasitic capacitance generated between the shield electrode 23 and the dummy shield electrode 24 is equalized to the parasitic capacitance between the pixel electrodes 11g overlapping the color filters 11k exhibiting a specific color. As a result, the amount of transmitted light of the color filters 11k exhibiting a specific color is equalized, so that when the specific color is displayed in a single color, streak-like color unevenness hardly occurs. Further, compared to the case where the shield electrode 23 and the dummy shield electrode 24 are arranged adjacent to all of the pixel electrodes 11g that overlap with the color filters 11k of the respective colors, it is possible to reduce the number of shield electrodes 23 and dummy shield electrodes 24 installed, which is suitable to improve the aperture ratio. Specifically, the shield electrode 23 and the dummy shield electrode 24 are each arranged adjacent to the pixel electrodes 11g overlapping (constituting the blue pixel unit BPX) with the blue color filters 11kB exhibiting a blue color in the pixel electrodes 11g. In this way, since the parasitic capacitance generated between the shield electrode 23 and the dummy shield electrode 24 is equalized to the parasitic capacitance between the pixel electrodes 11g overlapping the blue color filters 11kB exhibiting blue, the amount of transmitted light of the blue color filters 11kB exhibiting blue is equalized, so that blue streak-like color unevenness is less likely to occur when blue is displayed in a single color. Even if a slight amount of blue streak-like color unevenness occurs, the blue color is less visible than green or red, so that it is difficult for the color unevenness to be visually recognized.

As described above, as illustrated in FIG. 2, the shield electrode 23 and the dummy shield electrode 24 are selectively arranged such that the shield electrode 23 and the dummy shield electrode 24 are each adjacent to the specific gate line 11i included in the gate lines 11i. On the other hand, in the pixel electrodes 11g, a distance D3 between the pixel electrodes 11g between which the gate line 11i and the shield electrode 23 or the dummy shield electrode 24 are interposed is larger than a distance D4 between the pixel electrodes 11g between which the gate line 11i is interposed without the shield electrode 23 or the dummy shield electrode 24 interposed therebetween. In this way, compared to the case in which the distance between the pixel electrodes 11g between which the gate line 11i is interposed without the shield electrode 23 or the dummy shield electrode 24 being interposed therebetween is equal to the distance between the pixel electrodes 11g between which the gate line 11i and the shield electrode 23 or the dummy shield electrode 24 are interposed, the distance D4 between the pixel electrodes 11g between which the gate line 11i is interposed without the shield electrode 23 or the dummy shield electrode 24 being interposed therebetween is small. As a result, it is suitable to increase the aperture ratio. In the present embodiment, an arrangement pitch of the pixel electrode 11g in the Y-axis direction that is not adjacent to either the shield electrode 23 or the dummy shield electrode 24 in the Y-axis direction is about 65 μm, whereas an arrangement pitch of the pixel electrode 11g in the Y-axis direction that is adjacent to the shield electrode 23 or the dummy shield electrode 24 in the Y-axis direction is about 80 μm and is relatively wide.

A liquid crystal display device (display device with a position input function) 10 according to the present embodiment as described above includes: a pixel electrode 11g; a common electrode 11h which is arranged to at least partially overlap with the pixel electrode 11g on an upper layer side or a lower layer side; touch electrodes (position detection electrodes) 14 which are formed by dividing the common electrode 11h by a partition opening 11h2, form a capacitance with a finger which is a position input body performing a position input, and detect the input position input by the finger which is the position input body; a touch line (position detection line) 15 which is arranged on an upper layer side or a lower layer side with respect to the common electrode 11h and connected to the touch electrode 14; a gate line (pixel connection line) 11i connected to a gate electrode 11f1 of a TFT 11f which extends in parallel with the partition opening 11h2 and is connected to the pixel electrode 11g; and a shield electrode 23 which extends at least partially overlapping with the partition opening 11h2, and is arranged on the same layer as the touch line 15 and connected to the touch line 15.

According to such a configuration, a potential difference based on the voltage supplied to the pixel electrode 11g is generated between the pixel electrode 11g and the common electrode 11h at least partially overlapping with the pixel electrode 11g on the upper layer side or the lower layer side thereof, and the display is made using the potential difference. A TFT 11f is connected to the pixel electrode 11g, and the gate line 11i is connected to the gate electrode 11f1 of the TFT 11f. On the other hand, the touch electrode 14 formed by dividing the common electrode 11h by the partition opening 11h2 is connected to the touch line 15 arranged on the upper layer side or the lower layer side with respect to the common electrode 11h. The touch electrode 14 can form the capacitance with the finger which is the position input body performing the position input to detect the input position input by the finger which is the position input body using a signal supplied by the touch line 15.

Here, since the gate line 11i extends in parallel with the partition opening 11h2 that divides the common electrode 11h and partitions the adjacent touch electrodes 14, if the electric field is generated between the gate line 11i and the end portion of the touch electrode 14 on the partition opening 11h2, the display quality is likely to deteriorate due to the electric field near the end portion of the touch electrode 14 on the partition opening 11h2. In this regard, since the shield electrode 23 which at least partially extends overlapping with the partition opening 11h2 and is connected to the touch line 15 is provided, the electric field near the end portion of the touch electrode 14 on the partition opening 11h2 is weakened by the shield electrode 23. As a result, the deterioration in the display quality due to the electric field near the end portion of the touch electrode 14 on the partition opening 11h2 is suppressed. In addition, since the shield electrode 23 is arranged on the same layer as the touch line 15, the dedicated manufacturing process for forming the shield electrode 23 becomes unnecessary. As a result, it is suitable to reduce the manufacturing costs.

Further, the gate line 11i is arranged not to overlap with the partition opening 11h2. In this way, compared to the case in which the gate line 11i is disposed to overlap with the partition opening 11h2, the distance between the gate line 11i and the end portion of the touch electrode 14 on the partition opening 11h2 is large, so that the electric field generated between the gate line 11i and the end portion of the touch electrode 14 is more weakened. As a result, the deterioration in the display quality due to the electric field near the end portion of the touch electrode 14 on the partition opening 11h2 is more suitably suppressed.

Further, the pixel electrodes 11g and the gate lines 11i are provided for each and arranged alternately, and the shield electrode 23 is selectively arranged adjacent to the opposite side to the pixel electrode 11g side on which the gate line 11i is connected to the gate line 11i included in the gate lines 11i. In this way, since the shield electrode 23 is arranged not to be interposed between the gate line 11i and the pixel electrode 11g to which the gate line 11i is connected, the positional relationship between the gate line 11i adjacent to the shield electrode 23 and the pixel electrode 11g to which the gate line 11i is connected can be equal to the positional relationship between the gate line 11i not adjacent to the shield electrode 23 and the pixel electrode 11g to which the gate line 11i is connected. As a result, the parasitic capacitance generated between the gate line 11i and the pixel electrode 11g to which the gate line 11i is connected can be equalized, which results in being more suitable for suppressing the display quality from deteriorating.

In addition, the shield electrode 23 is arranged such that the distance between the adjacent pixel electrodes 11g is equal to the distance between the gate line 11i and the pixel electrode 11g. In this way, the parasitic capacitance generated between the shield electrode 23 and the pixel electrode 11g adjacent to the shield electrode 23 is equalized to the parasitic capacitance generated between the gate line 11i and the pixel electrode 11g. As a result, it is more suitable for suppressing the display quality from deteriorating.

Further, the pixel electrode 11g, the gate line 11i, and the shield electrode 23 include those arranged on the same layer and those arranged on the upper layer side or the lower layer side with respect to the pixel electrode 11g, the gate line 11i, and the shield electrode 23, the pixel electrodes 11g and the gate lines 11i are provided for each and arranged alternately, and include the dummy shield electrode 24 which is arranged adjacent to the gate line 11i and the pixel electrode 11g not to overlap with the partition opening 11h2 and extends in parallel with the shield electrode 23, and is arranged on the same layer as the touch line 15 and connected to the touch line 15. If it is assumed that the pixel electrode 11g, the gate line 11i, and the shield electrode 23 are each patterned in different manufacturing processes, the positional relationship between the gate line 11i and the shield electrode 23 tends to vary due to the manufacturing error for the pixel electrode 11g, and the like. In this regard, the dummy shield electrode 24 adjacent to the gate line 11i and the pixel electrode 11g not to overlap with the partition opening 11h2 as described above is connected to the touch line 15 which extends in parallel with the shield electrode 23 and is disposed on the same layer as the touch line 15 to be connected to the touch line 15, even if the positional relationship of the shield electrode 23 with respect to the pixel electrode 11g varies due to the manufacturing error or the like, the positional relationship of the dummy shield electrode 24 with respect to the pixel electrode 11g varies similarly. Therefore, the parasitic capacitance related to the pixel electrode 11g adjacent to the dummy shield electrode 24 is equalized to the parasitic capacitance related to the pixel electrode 11g adjacent to the shield electrode 23. As a result, it is more suitable for suppressing the display quality from deteriorating.

Further, color filters 11k that arranged to overlap with pixel electrodes 11g and exhibit at least blue, green, and red and are arranged along the arrangement direction of the pixel electrode 11g and the gate line 11i are provided, and the shield electrode 23 and the dummy shield electrode 24 are selectively arranged adjacent to each of the pixel electrodes 11g overlapping the color filters 11k exhibiting a specific color among the pixel electrodes 11g. In this way, since the color filters 11k exhibiting at least blue, green, and red are arranged to overlap with the pixel electrodes 11g, the color filters 11k can display predetermined color images based on signals supplied to the pixel electrodes 11g by the gate lines 11i. Since the shield electrode 23 and the dummy shield electrode 24 are selectively arranged such that the shield electrode 23 and the dummy shield electrode 24 are each adjacent to the pixel electrodes 11g overlapping with the color filters 11k exhibiting a specific color among the pixel electrodes 11g, the parasitic capacitance generated between the shield electrode 23 and the dummy shield electrode 24 is equalized to the parasitic capacitance between the pixel electrodes 11g overlapping the color filters 11k exhibiting a specific color. As a result, the amount of transmitted light of the color filters 11k exhibiting a specific color is equalized, so that when the specific color is displayed in a single color, streak-like color unevenness hardly occurs. Further, compared to the case where the shield electrode 23 and the dummy shield electrode 24 are arranged adjacent to all of the pixel electrodes 11g that overlap with the color filters 11k of the respective colors, it is possible to reduce the number of shield electrodes 23 and dummy shield electrodes 24 installed, which is suitable to improve the aperture ratio.

In addition, the shield electrode 23 and the dummy shield electrode 24 are each arranged adjacent to the pixel electrodes 11g overlapping with the blue color filters 11kB exhibiting a blue color in the pixel electrodes 11g. In this way, since the parasitic capacitance generated between the shield electrode 23 and the dummy shield electrode 24 is equalized to the parasitic capacitance between the pixel electrodes 11g overlapping the blue color filters 11kB exhibiting blue, the amount of transmitted light of the blue color filters 11kB exhibiting blue is equalized, so that blue streak-like color unevenness is less likely to occur when blue is displayed in a single color. Even if a slight amount of blue streak-like color unevenness occurs, the blue color is less visible than green or red, so that it is difficult for the color unevenness to be visually recognized.

In addition, the interlayer insulating film (insulating film) 21 interposed between the touch line 15, the shield electrode 23, and the dummy shield electrode 24, and the touch electrode 14 is provided, and in the interlayer insulating film 21, the contact hole 25 is provided at the position where the touch electrode 14 and the dummy shield electrode 24 overlap with each other such that the contact hole 25 is opened. In this way, the touch electrode 14 and the dummy shield electrode 24 are connected to each other through the contact hole 25 of the interlayer insulating film 21, so that the touch line 15 is connected to the touch electrode 14. Since the touch line 15 and the touch electrode 14 can be connected to each other using the arrangement space of the dummy shield electrode 24, compared to the case where the touch line 15 and the touch electrode 14 are directly connected to each other, the arrangement efficiency is preferable.

In addition, the pixel electrodes 11g and the gate lines 11i are provided for each and arranged alternately, the shield electrode 23 is selectively arranged adjacent to the gate lines 11i included in the gate lines 11i, and in the pixel electrodes 11g, the distance between the pixel electrodes 11g between which the gate line 11i and the shield electrode 23 are interposed is larger than the distance between the pixel electrodes 11g between which the gate line 11i is interposed without the shield electrode 23 being interposed therebetween. In this way, compared to the case in which the distance between the pixel electrodes 11g between which the gate line 11i is interposed without the shield electrode 23 being interposed therebetween is equal to the distance between the pixel electrodes 11g between which the gate line 11i and the shield electrode 23 are interposed, the distance between the pixel electrodes 11g between which the gate line 11i is interposed without the shield electrode 23 being interposed therebetween is small. As a result, it is suitable to increase the aperture ratio.

In addition, the touch line 15 and the shield electrode 23 are arranged on the lower layer side of the common electrode 11h and on the upper layer side of the gate line 11i. In this way, a relatively strong electric field is generated between the shield electrode 23 and the gate line 11*i* on the lower layer side thereof, so that the electric field generated between the gate line 11*i* and the end portion of the touch electrode 14 on the partition opening 11*h*2 is relatively weakened. As a result, the electric field near the end portion of the touch electrode 14 on the partition opening 11*h*2 is suitably weakened, so that the display quality suitably deteriorates due to the electric field near the end portion of the touch electrode 14 on the partition opening 11*h*2.

Further, the pixel electrode 11*g* has the longitudinal shape in which the extending direction of the gate line 11*i* and the shield electrode 23 is the long side direction. Compared to the case where the pixel electrode 11*g* has the longitudinal shape in which the direction perpendicular to the extending direction of the gate line 11*i* and the shield electrode 23 is the long side direction, the display quality is more likely to deteriorate due to the electric field near the end portion of the touch electrode 14 on the partition opening 11*h*2. In this regard, since the shield electrode 23 which at least partially overlaps with the partition opening portion 11*h*2 and is connected to the touch line 15 is provided, the electric field near the end portion of the touch electrode 14 on the partition opening 11*h*2 is weakened by the shield electrode 23, so that it is possible to suitably suppress the display quality from deteriorating due to the electric field near the end portion of the touch electrode 14 on the partition opening 11*h*2.

Second Embodiment

A second embodiment of the present invention will be described with reference to FIGS. 10 to 12. In the second embodiment, it is illustrated that a configuration of a dummy shield electrode 124 is changed. Note that an overlapping description for a structure, an action, and an effect similar to those of the first embodiment described above is omitted.

Figure 10:
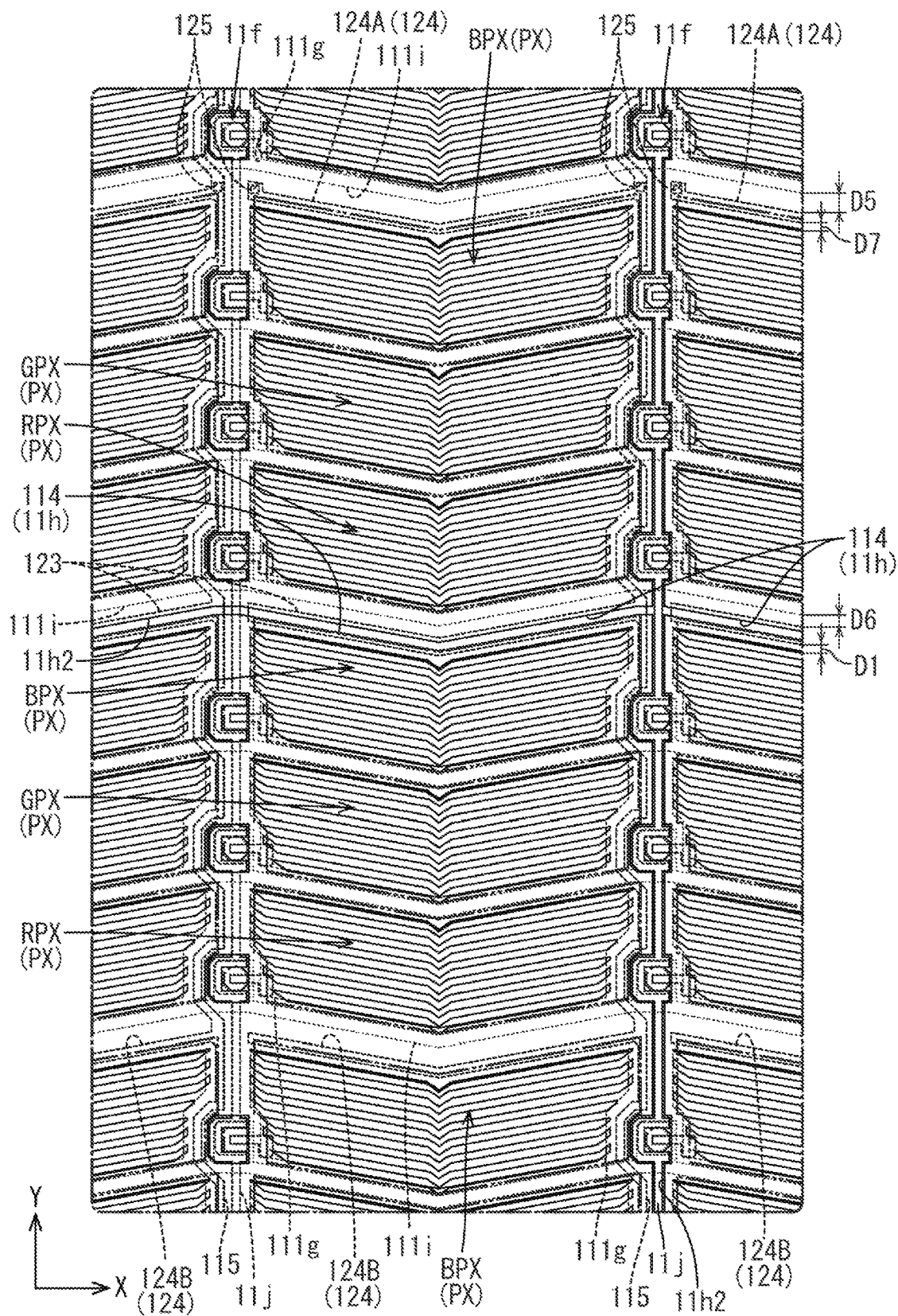
FIG. 10 is a plan view illustrating a pixel arrangement of an array substrate and a CF substrate constituting a liquid crystal panel according to a second embodiment of the present invention.
Figure 11:
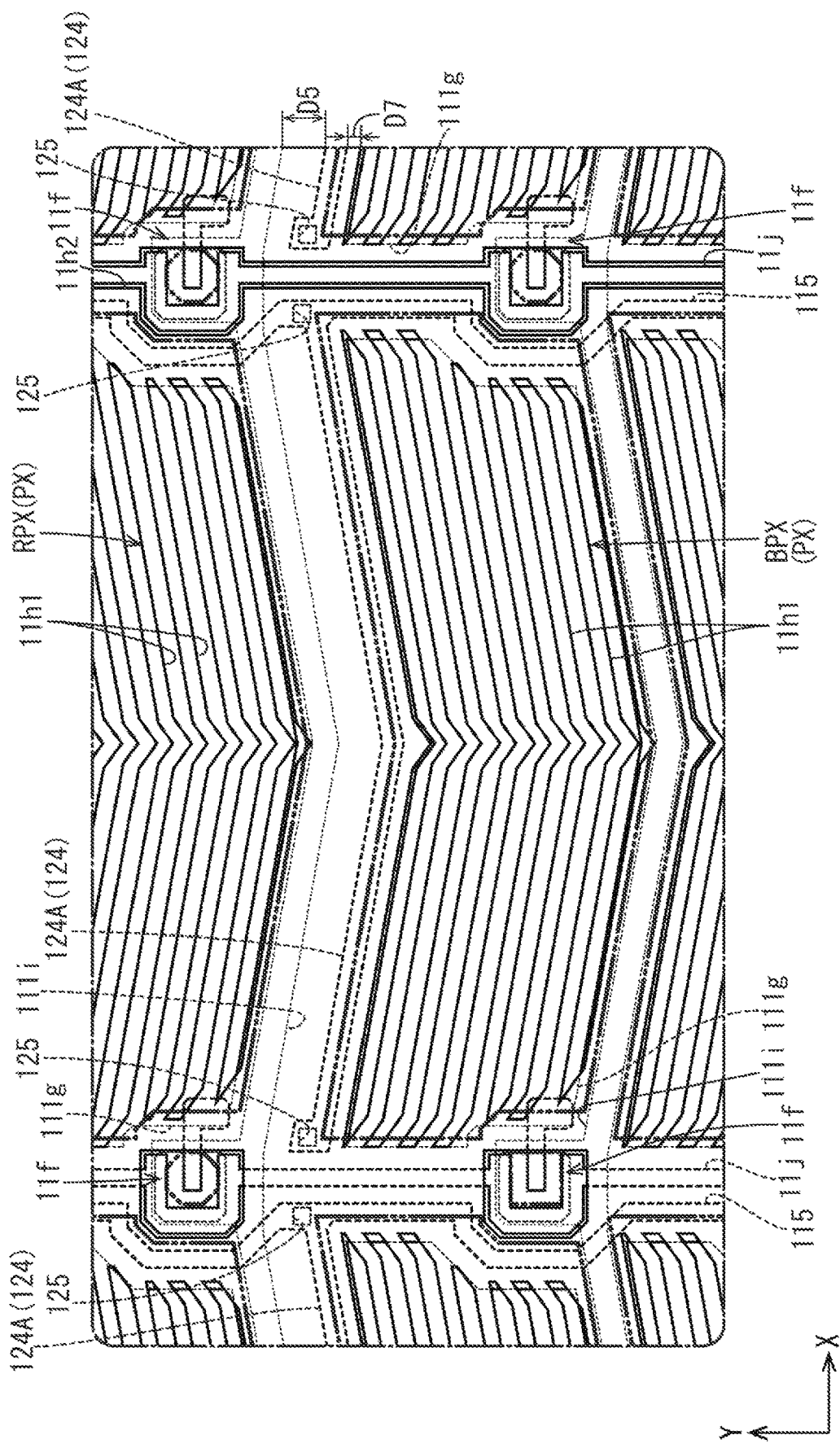
FIG. 11 is an enlarged plan view of the vicinity of a first dummy shield electrode on the array substrate and the CF substrate.
Figure 12:
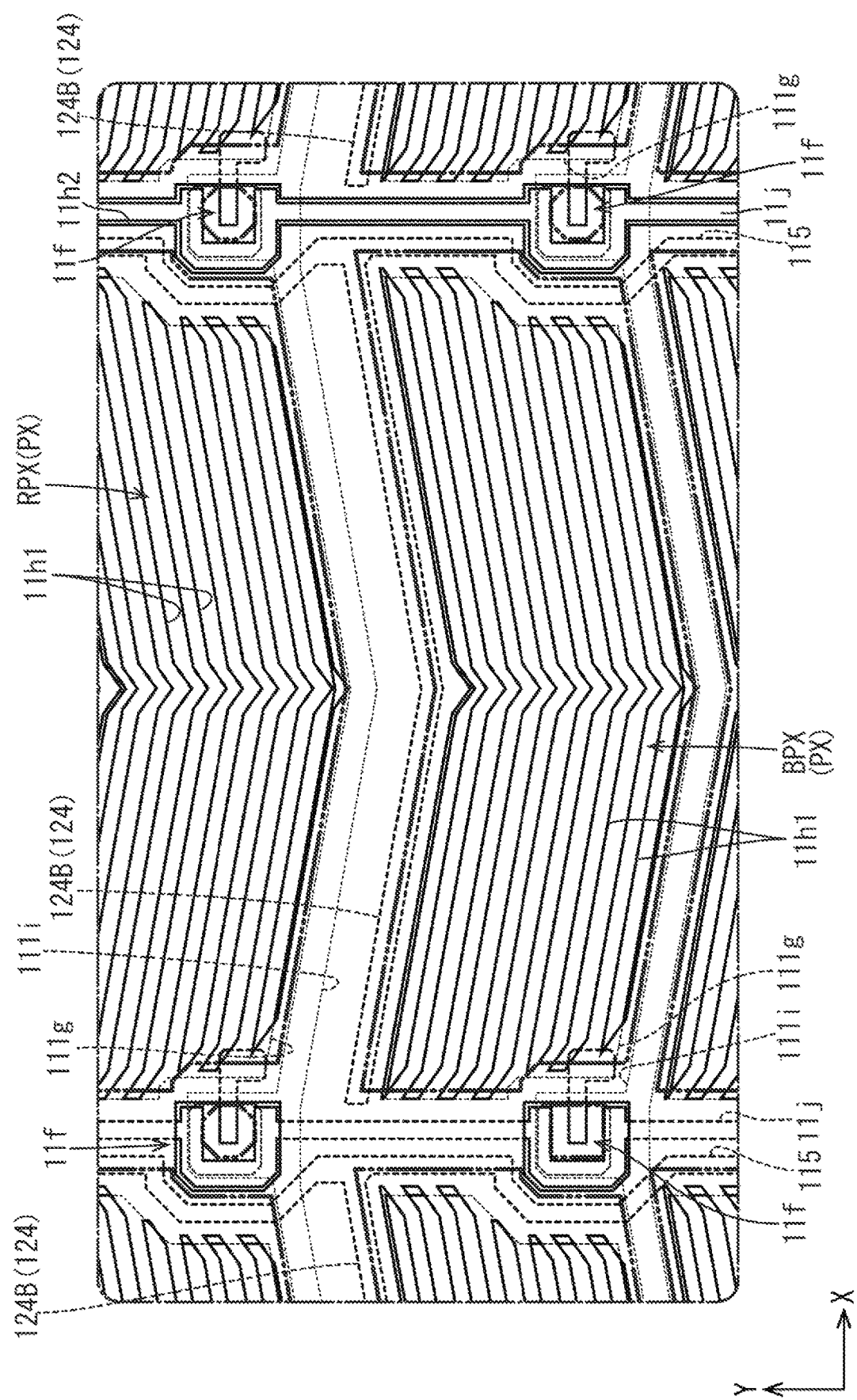
FIG. 12 is an enlarged plan view of the vicinity of a second dummy shield electrode on the array substrate and the CF substrate.

As illustrated in FIGS. 10 to 12, a dummy shield electrode 124 according to the present embodiment is arranged such that a distance D5 between the dummy shield electrode 124 and a gate line 111*i* adjacent thereto in a Y-axis direction is larger than a distance D6 between a shield electrode 123 and the gate line 111*i* adjacent thereto in the Y-axis direction. On the other hand, the dummy shield electrode 124 is arranged such that a distance D7 between the dummy shield electrode 124 and a pixel electrode 111*g* adjacent thereto in the Y-axis direction is equal to a distance D1 between the shield electrode 123 and the pixel electrodes 111*g* adjacent thereto in the Y-axis direction. First, the distance D7 between the dummy shield electrode 124 and the pixel electrode 111*g* is equal to the distance D1 between the shield electrode 123 and the pixel electrode 111*g*, so that a parasitic capacitance generated between the dummy shield electrode 124 and the pixel electrode 111*g* is equalized to a parasitic capacitance between the shield electrode 123 and the pixel electrode 111*g*. As a result, it is more suitable for suppressing the display quality from deteriorating. On the other hand, the distance D5 between the dummy shield electrode 124 and the gate line 111*i* is larger than the distance D6 between the shield electrode 123 and the gate line 111*i*, so that a parasitic capacitance generated between the dummy shield electrode 124 and the gate line 111*i* is smaller than a parasitic capacitance generated between the shield electrode 123 and the gate line 111*i*. As a result, signal dullness hardly occurs in the gate line 111*i* adjacent to the dummy shield electrode 124, and position detection sensitivity of a touch electrode 114 to which the dummy shield electrode 124 is connected is hard to be reduced.

Figure 13:
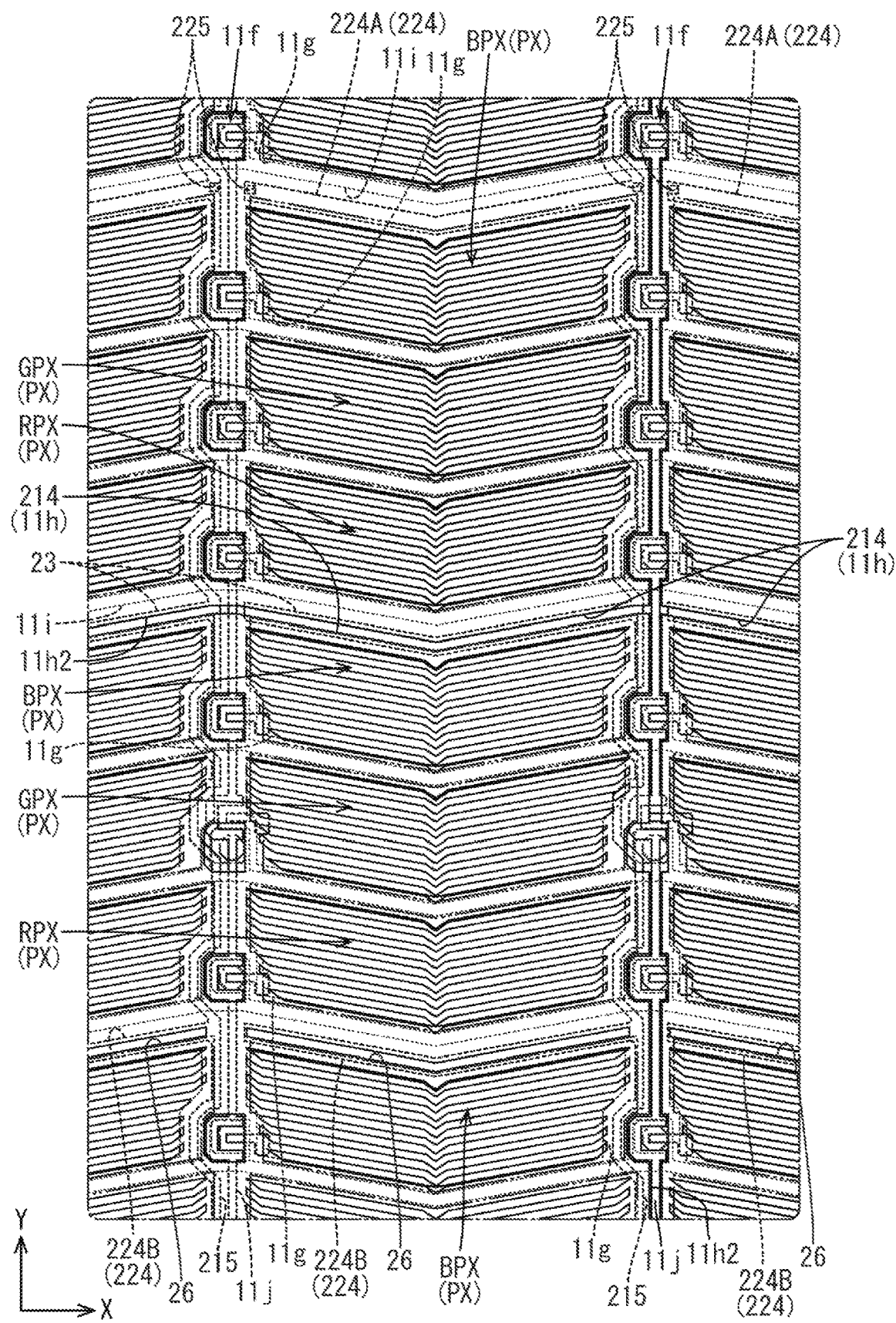
FIG. 13 is a plan view illustrating a pixel arrangement of an array substrate and a CF substrate constituting a liquid crystal panel according to a third embodiment of the present invention.

Here, FIG. 10 illustrates two dummy shield electrodes 124, but a first dummy shield electrode 124A on the upper side in FIG. 13 is electrically connected to the touch electrode 114 through a contact hole 125, but a second dummy shield electrode 124B on the lower side in FIG. 13 is not connected to the touch electrode 114. Therefore, the dummy shield electrodes 124 connected to the same touch line 115 includes one (first dummy shield electrode 124A) connected to the touch electrode 114 and one (second dummy shield electrode 124B) which is not connected to any one of the touch electrode 114 through the contact hole 125 and is disposed to overlap with the touch electrode 114 that is not a connection target in a plan view. The second dummy shield electrode 124B, which is arranged to overlap with the touch electrode 114 that is not the connection target in a plan view, generates a parasitic capacitance between the second dummy shield electrode 124B and the touch electrode 114, so that the touch sensitivity (position detection sensitivity) may be reduced due to the parasitic capacitance. In this regard, in the present embodiment, the dummy shield electrode 124 has a line width narrower than that of the shield electrode 123, as illustrated in FIGS. 11 and 12. In this way, since the parasitic capacitance generated between the second dummy shield electrode 124B and the touch electrode 114 that is not the connection target of the second dummy shield electrode 124B is reduced, the touch sensitivity is hardly reduced.

As described above, according to the present embodiment, the dummy shield electrode 124 is arranged such that the distance between the dummy shield electrode 124 and the gate line 111*i* is larger than the distance between the shield electrode 123 and the gate line 111*i* and the distance between the dummy shield electrode 124 and the pixel electrode 111*g* is equal to the distance between the shield electrode 123 and the pixel electrode 111*g*. First, the distance between the dummy shield electrode 124 and the pixel electrode 111*g* is equal to the distance between the shield electrode 123 and the pixel electrode 111*g*, so that a parasitic capacitance generated between the dummy shield electrode 124 and the pixel electrode 111*g* is equalized to a parasitic capacitance between the shield electrode 123 and the pixel electrode 111*g*. As a result, it is more suitable for suppressing the display quality from deteriorating. On the other hand, the distance between the dummy shield electrode 124 and the gate line 111*i* is larger than the distance between the shield electrode 123 and the gate line 111*i*, so that the parasitic capacitance generated between the dummy shield electrode 124 and the gate line 111*i* is smaller than the parasitic capacitance generated between the shield electrode 123 and the gate line 111*i*. As a result, signal dullness hardly occurs in the gate line 111*i* adjacent to the dummy shield electrode 124, and position detection sensitivity of a touch electrode 114 to which the dummy shield electrode 124 is connected is hard to be reduced.

Further, the dummy shield electrode 124 has a narrower line width than the shield electrode 123. When the touch electrode 114 that overlaps with the dummy shield electrode 124 is not a connection target of the dummy shield electrode 124, the position detection sensitivity may be reduced due to the parasitic capacitance generated between the dummy shield electrode 124 and the touch electrode 114. In this regard, as described above, the line width of the dummy shield electrode 124 is narrower than the line width of the shield electrode 123, so that the parasitic capacitance generated between the dummy shield electrode 124 and the touch electrode 114 that is not the connection target of the dummy shield electrode 124 may be reduced. As a result, the position detection sensitivity is hardly reduced.

Third Embodiment

Figure 14:
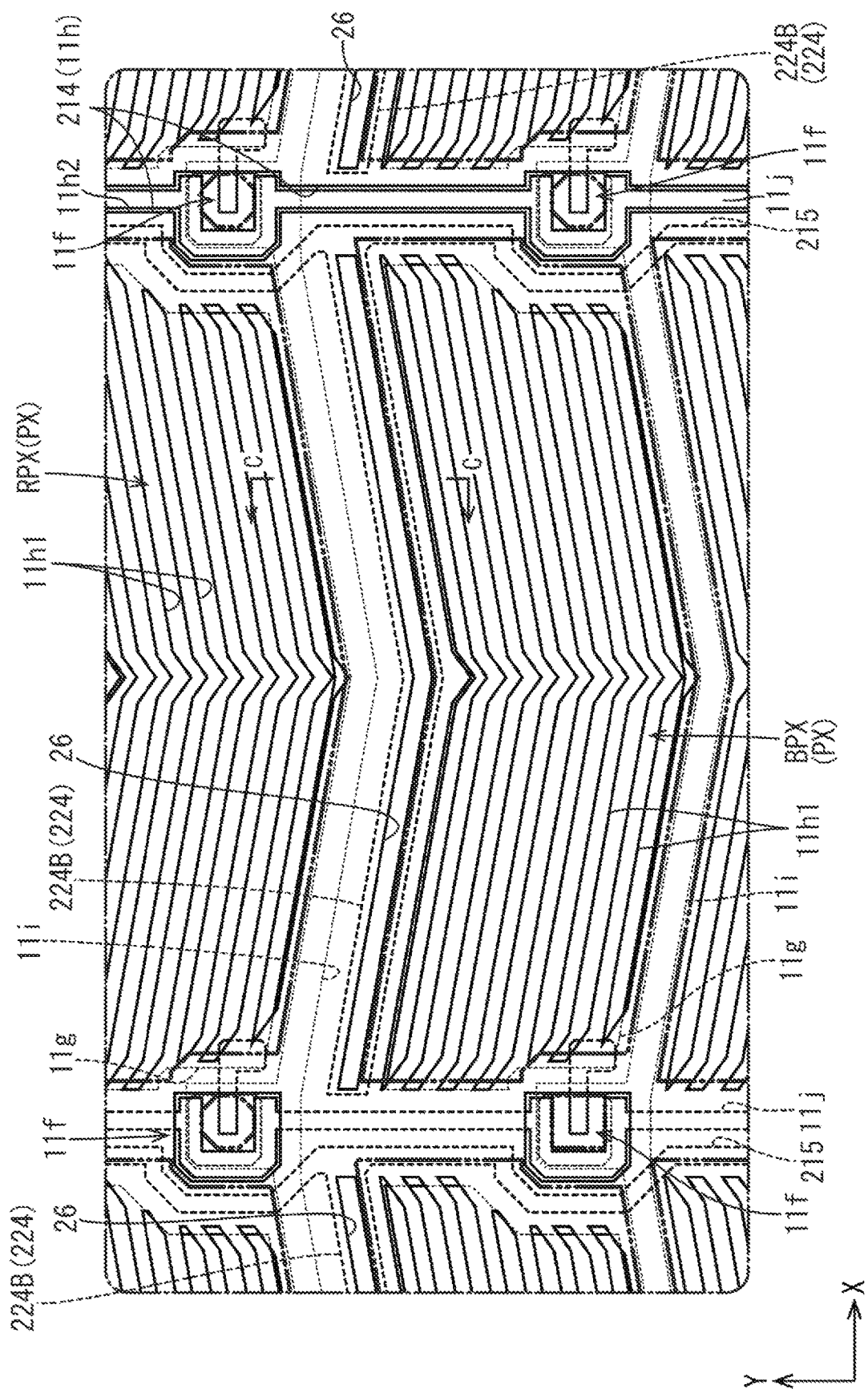
FIG. 14 is an enlarged plan view of the vicinity of a second dummy shield electrode on the array substrate and the CF substrate.
Figure 15:
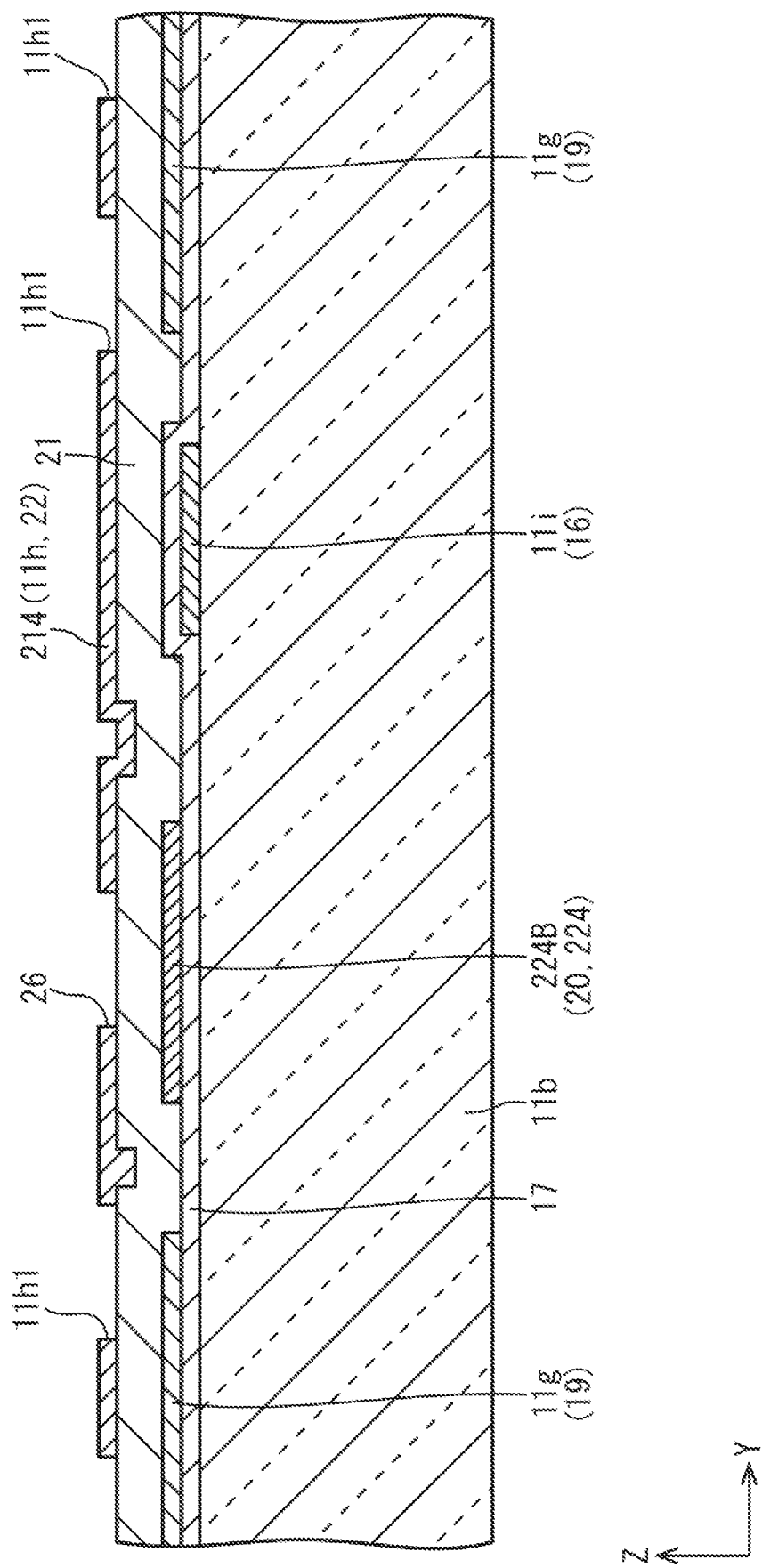
FIG. 15 is a cross-sectional view of the array substrate illustrated in FIG. 14 taken along line C-C.

A third embodiment of the present invention will be described with reference to FIGS. 13 to 15. In the third embodiment, it is illustrated that a configuration of a touch electrode 214 is changed from the first embodiment described above. Note that an overlapping description for a structure, an action, and an effect similar to those of the first embodiment described above is omitted.

FIG. 13 illustrates two dummy shield electrodes 224, but a first dummy shield electrode 224A on the upper side in FIG. 13 is electrically connected to the touch electrode 214 through a contact hole 225, but a second dummy shield electrode 224B on the lower side in FIG. 13 is not connected to the touch electrode 214. Therefore, the dummy shield electrodes 224 connected to the same touch line 215 includes one (first dummy shield electrode 224A) connected to the touch electrode 214 through the contact hole 225 and one (second dummy shield electrode 224B) which is not connected to any one of the touch electrode 214 and is disposed to overlap with the touch electrode 214 that is not a connection target in a plan view. The second dummy shield electrode 224B, which is arranged to overlap with the touch electrode 214 that is not the connection target in a plan view, generates a parasitic capacitance between the second dummy shield electrode 224B and the touch electrode 214, so that the touch sensitivity (position detection sensitivity) may be reduced due to the parasitic capacitance. In this regard, in the present embodiment, the touch electrode 214 is provided with the opening 26 to overlap with the second dummy shield electrode 224B that does not overlap the contact hole 225 among the dummy shield electrodes 224. In this way, a parasitic capacitance generated between the touch electrode 214 and the second dummy shield electrode 224B that is not connected to the touch electrode 214 can be reduced as much as the opening 26 is formed. As a result, the reduction in the touch sensitivity is suppressed. The opening 26 extends substantially along the X-axis direction to be parallel with the dummy shield electrode 224, and extends over the substantially entire length of the dummy shield electrode 224.

As described above, according to the present embodiment, the dummy shield electrodes 224 are provided and selectively includes one overlapping with the contact hole 225, and the touch electrode 214 is provided with the opening 26 to overlap with the dummy shield electrode 224 that does not overlap with the contact hole 225 among the dummy shield electrodes 224. Among the dummy shield electrodes 224, the dummy shield electrode 224 that overlaps with the contact hole 225 is connected to the touch electrode 214, whereas the dummy shield electrode 224 that does not overlap with the contact hole 225 is not connected to the touch electrode 214. Since the touch electrode 214 is provided with the opening 26 to overlap with the dummy shield electrode 224 that is not the connection target, the parasitic capacitance generated between the touch electrode 214 and the dummy shield electrode 224 that is not the connection target can be reduced. As a result, the reduction in the position detection sensitivity is suppressed.

Fourth Embodiment

A fourth embodiment of the present invention will be described with reference to FIG. 16 or 17. The fourth embodiment illustrates a curved liquid crystal panel 311 from the first embodiment described above. Note that an overlapping description for a structure, an action, and an effect similar to those of the first embodiment described above is omitted.

Figure 16:
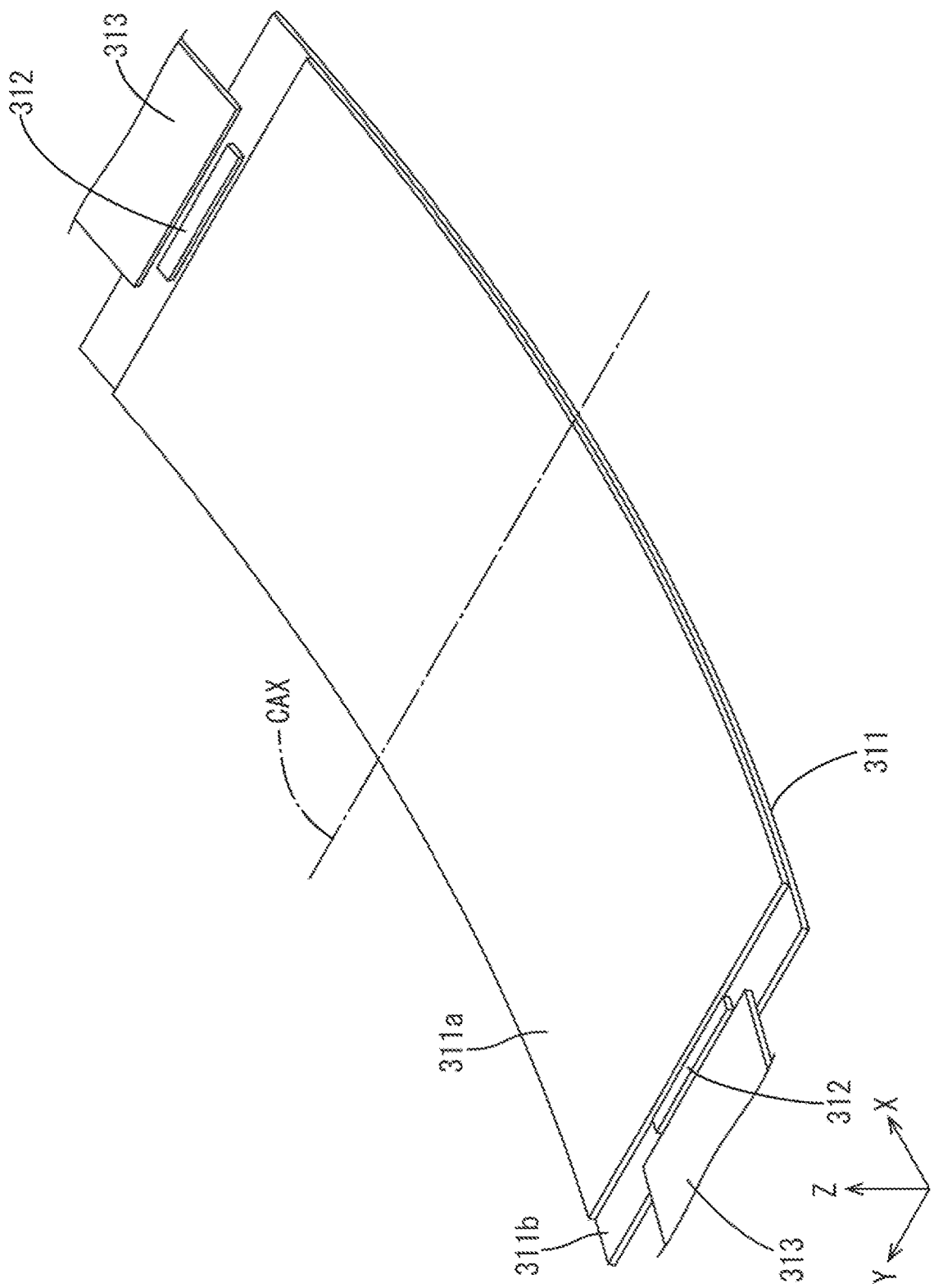
FIG. 16 is a schematic perspective view of a liquid crystal panel according to a fourth embodiment of the present invention.
Figure 17:
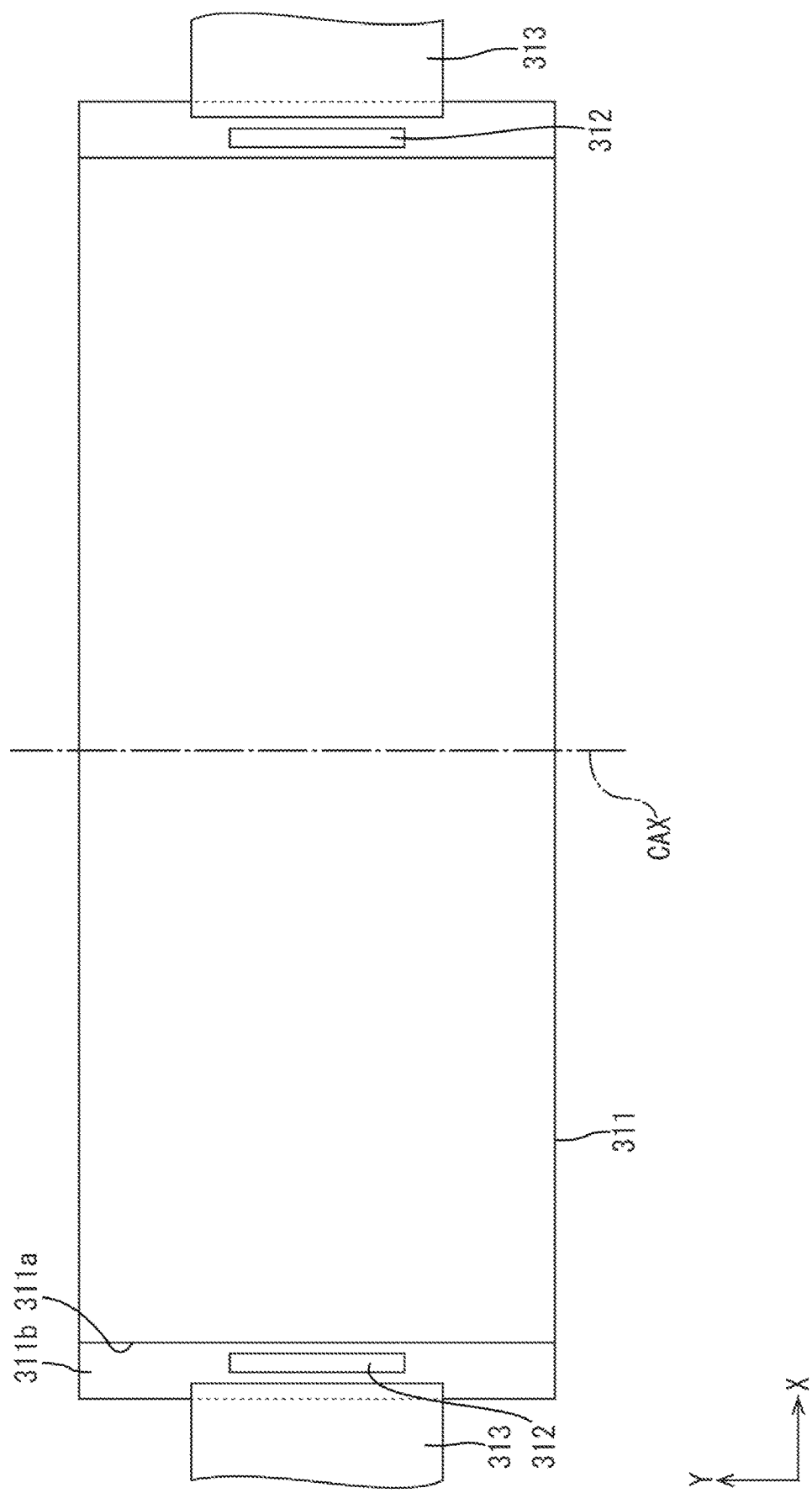
FIG. 17 is a plan view of the liquid crystal panel.

As illustrated in FIGS. 16 and 17, the liquid crystal panel 311 according to the present embodiment is bent substantially in an arc shape as a whole in a form in which a central portion in a long side direction (X-axis direction) is retracted to the back side and both end portions in the long side direction protrude to a front side (inwardly curved shape). A curved axis CAX of the liquid crystal panel 311 has an axial direction aligned with the Y-axis direction, and is disposed on a CF substrate 311a side which is an opposite side to an array substrate 311b side in a Z-axis direction. That is, the CF substrate 311a is disposed closer to the curved axis CAX than the array substrate 311b in the Z-axis direction. Therefore, it can be said that the array substrate 311b and the CF substrate 311a constituting the liquid crystal panel 311 have plate surfaces bent around the curved axis CAX parallel with a short side direction of a pixel electrode. As described above, if the array substrate 311b and the CF substrate 311a are bent around the curved axis CAX, a positional relationship between a color filter on the CF substrate 311a side and the pixel electrode on the array substrate 311b side may vary in the bending direction. In this regard, since the array substrate 311b and the CF substrate 311a are bent around the curved axis CAX parallel to a short side direction of the pixel electrode, that is, an arrangement direction of the color filters exhibiting different colors (Y-axis direction), even if the positional relationship between the color filter and the pixel electrode varies in the bending direction (X-axis direction) due to the bending, the color filter exhibiting the same color are arranged in the bending direction, so that a mixed color is hardly generated. Note that the configurations of the color filter, the pixel electrode, and the like are as described with reference to FIGS. 2 and 3 described in the first embodiment. Further, a driver 312 and a flexible substrate 313 are each mounted in pairs on both end portions of the liquid crystal panel 311 in the X-axis direction (bending direction) among outer circumferential end portions of the liquid crystal panel 311.

As described above, according to the present embodiment, the liquid crystal panel 311 includes an array substrate 311b which is provided with at least a common electrode, a pixel electrode, a touch electrode, a touch line, a gate line, and a shield electrode, and a CF (counter substrate) substrate 311a which is arranged to face the array substrate 311b with a gap therebetween, arranged to overlap with at least each of pixel electrodes, and arranged such that the color filters exhibiting at least blue, green, and red are arranged in a short side direction of the pixel electrode, and the array substrate 311b and the CF substrate 311a have plate surfaces bent around the curved axis CAX parallel to the short side direction of the pixel electrode. When the array substrate 311b and the CF substrate 311a are bent around the curved axis CAX, the positional relationship between the color filter and the pixel electrode can vary in the bending direction. In this regard, since the array substrate 311b and the CF substrate 311a are bent around the curved axis CAX parallel to a short side direction of the pixel electrode, that is, an arrangement direction of the color filters exhibiting different colors, even if the positional relationship between the color filter and the pixel electrode varies in the bending direction due to the bending, the color filter exhibiting the same color are arranged in the bending direction, so that a mixed color is hardly generated.

Fifth Embodiment

A fifth embodiment of the present invention will be described with reference to FIG. 18. In the fifth embodiment, it is illustrated that an arrangement of a shield electrode 423 is changed from the first embodiment described above. Note that an overlapping description for a structure, an action, and an effect similar to those of the first embodiment described above is omitted.

Figure 18:
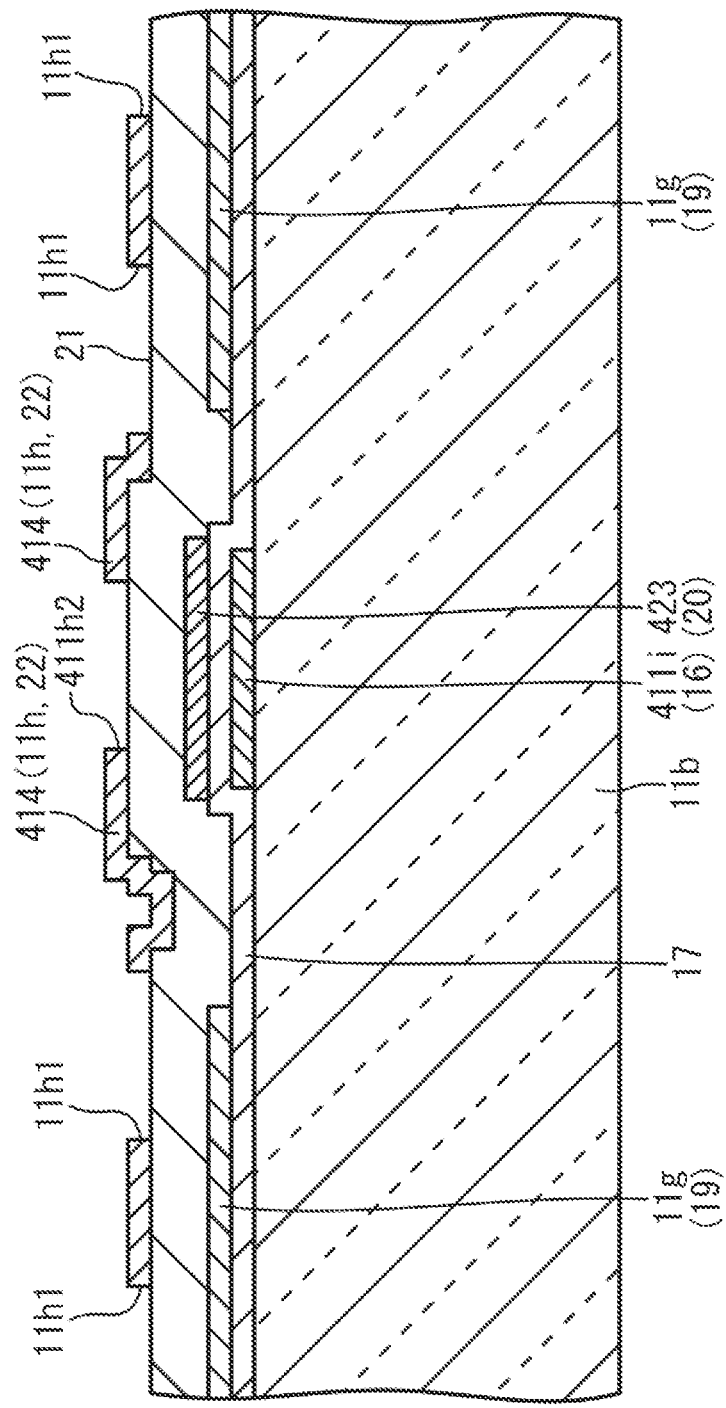
FIG. 18 is a cross-sectional view of the vicinity of a shield electrode on an array substrate constituting a liquid crystal panel according to a fifth embodiment of the present invention.

As illustrated in FIG. 18, the shield electrode 423 and a partition opening portion 411h2 according to the present embodiment are arranged to overlap with a gate line 411i in a plan view. Even in such a configuration, at least an electric field near an end portion of the touch electrode 414 on the partition opening 411h2 is suitably weakened by the shield electrode 423, so that the display quality suitably deteriorates due to the electric field near the end portion of the touch electrode 414 on the partition opening 411h2.

Other Embodiments

The present invention is not limited to the embodiments described with reference to the above description and drawings, and, for example, the following embodiments are also included in the technical scope of the present invention.

(1) Each embodiment described above illustrates the case where the second metal film that constitutes the shield electrode, the touch line, and the like is disposed in the same layer as the first transparent electrode film that constitutes the pixel electrode, but the second metal film is disposed on a different layer (upper layer side or lower layer side) with respect to the first transparent electrode film through an insulating film.

(2) In addition to the embodiments described above, the first metal film constituting the gate line or first metal film constituting the shield electrode, the touch line or the like may have the stacked structure in which the transparent electrode film is stacked on the upper layer side or the lower layer side thereof.

(3) Each of the embodiments described above illustrates the case where the second metal film constituting the shield electrode, the touch line or the like is arranged on the lower layer side with respect to the second transparent electrode film constituting the common electrode and the touch electrode, but the second metal film may be disposed on the upper layer side with respect to the second transparent electrode film through the insulating film.

(4) Each of the embodiments described above illustrates the case where the first metal film relatively disposed on the lower layer side constitutes the gate line or the like and the second metal film relatively disposed on the upper layer side constitutes the shield electrode, the touch line, or the like, but the first metal film relatively disposed on the lower layer side may constitute the shield electrode or the touch line, and the second metal film relatively disposed on the upper layer side may constitute the gate line or the like.

(5) Each of the embodiments described above illustrates the case where the shield electrode and the dummy shield electrode are selectively disposed adjacent to the pixel electrode overlapping the color filter exhibiting blue, but the shield electrode and the dummy shield electrode may each be selectively disposed adjacent to the pixel electrode overlapping the color filter exhibiting green or red. Further, the shield electrode and the dummy shield electrode may be randomly disposed without being adjacent to the pixel electrode overlapping with the color filter exhibiting the specific color.

(6) Each of the embodiments described above illustrates the case where two contact holes are provided for one dummy shield electrode, but one or three or more contact holes can also be provided for one dummy shield electrode. In addition, the specific arrangement of the contact holes with respect to the dummy shield electrode can be changed as appropriate. Further, the contact hole may overlap with the dummy shield electrode, and may be disposed at the position not overlapping with the touch line.

(7) In addition to ones described with reference to the drawings of each embodiment described above, the specific planar shape, planar arrangement, formation range in a plan view and the like of the pixel electrode, the gate line, the source line, the TFT, the shield electrode, the dummy shield electrode, and the like can be changed as appropriate.

(8) Of course, it is possible to suitably combine the technical items described in each of the embodiments described above with each other.

(9) Each of the embodiments illustrates the case where the number of colors of the color filter is set to 3, but the number of colors of the color filter can be changed to 4 or more. In this way, the number of source lines installed and the number of image signals supplied to the source lines can be further reduced.

(10) Each of the embodiments described above illustrates the case where the pixel electrode, the shield electrode, and the dummy shield electrode are bent once while extending substantially along the X-axis direction, but the configuration in which the pixel electrode, the shield electrode, and the dummy shield electrode are bent twice or more or the configuration in which the pixel electrode, the shield electrode, and the dummy shield electrode extend substantially straight along the X-axis direction without being bent in the middle of the extension.

(11) In addition to the embodiments described above, the specific numerical values such as the arrangement pitch of the pixel electrodes can be appropriately changed.

(12) Each of the embodiments described above illustrates the case where the pixel electrode has the horizontally long shape in which the extending direction of the gate line matches the long side direction, but the pixel electrode may have the longitudinally long shape in which the extending direction of the gate line matches the short side direction.

(13) In each of the embodiments described above, a case where the touch panel pattern is configured in the self-capacitance manner has been described, but the touch panel pattern may also be configured in a mutual capacitance manner.

(14) Each of the embodiments described above illustrates the case where the driver is directly chip on glass (COG) mounted on the array substrate constituting the curved liquid crystal panel, but the driver may connect the chip on film (COF) mounted flexible substrate to the array substrate.

(15) Each of the embodiments described above illustrates the case where the planar shape of the curved liquid crystal panel is rectangular, but the planar shape of the curved liquid crystal panel may be a square, a circle, a semi-circle, an ellipse, a semi-ellipse, and a trapezoid in addition to a rectangle.

EXPLANATION OF SYMBOLS

10: Liquid crystal display device (Display device with position input function)
11, 311: Liquid crystal panel (Display panel)
11a, 311a: CF substrate (Counter substrate)
11b, 311b: Array substrate 11g, 111g: Pixel electrode
11h: Common electrode
11h2, 411h2: Partition opening portion
11i, 111i, 411i: Gate line (Pixel connection line)
11k: Color filter
11kB: Blue color filter (Color filter exhibiting blue)
14, 114, 214, 414: Touch electrode (Position detection electrode)
15, 115, 215: Touch line (Position detection line)
21: Interlayer insulating film (Insulating film)
23, 123, 423: Shield electrode
24, 124, 224: Dummy shield electrode
25, 125, 225: Contact hole
26: Opening
CAX: Curved axis

The invention claimed is:

1. A display device with a position input function, the display device comprising:
    a pixel electrode;
    a common electrode being above or below the pixel electrode;
    a plurality of position detection electrodes defined by dividing the common electrode by a partition opening, the plurality of position detection electrodes and a position input body, that performs a position input, creating a capacitance therebetween, and the plurality of position detection electrodes detecting an input position input by the position input body;
    a position detection line being below the common electrode and connected to one of the plurality of position detection electrodes, the position detection line including a first section being opposite the one of the plurality of position detection electrodes and a second section being opposite the partition opening;
    a gate line extending parallel to the partition opening;
    a switching element connected to the pixel electrode, the switching element including a gate electrode connected to the gate line; and
    an electrode protruding from a side edge of the first section of the position detection line, at least a portion of the electrode not being opposite the partition opening, the electrode being below the common electrode and above the gate line, and at least a portion of the electrode being connected to the one of the plurality of position detection electrodes,
    wherein the position detection line and the electrode are included in a lower layer than the common electrode and in an upper layer than the gate line.

2. The display device according to claim 1, wherein the common electrode is above the pixel electrode.

3. The display device according to claim 1, wherein the common electrode is below the pixel electrode.

4. The display device according to claim 1, wherein the electrode is arranged such that not to overlap with the pixel electrode.

5. The display device according to claim 1, wherein the position detection line and the electrode are disposed on a lower layer side, with respect to the pixel electrode, through an insulating film.

6. The display device according to claim 1, further comprising a source line extending perpendicular to the gate line, wherein the position detection line extends in a direction in which the source line extends.

7. The display device according to claim 1, wherein each of the plurality of position detection electrodes includes slits.

8. The display device according to claim 1, wherein the pixel electrode has a longitudinally long shape in which an extending direction of the gate line matches a short side direction.

9. The display device according to claim 1, further comprising a liquid crystal panel configured to operate in a fringe field switching mode.

10. The display device according to claim 1, further comprising:
    a plurality of pixel electrodes, including the pixel electrode; and
    a plurality of color filters arranged to overlap the plurality of pixel electrodes, respectively, and exhibiting at least blue, green, and red colors, wherein
    the electrode is arranged adjacent to one of the plurality of pixel electrodes overlapping one of the plurality of color filters exhibiting the blue color.

11. The display device according to claim 1, wherein the electrode protrudes from the side edge of the first section of the position detection line in an extending direction in which the gate line extends.

12. The display device according to claim 11, wherein the electrode extends in the extending direction, in which the gate line extends, without being bent.

13. The display device according to claim 1, further comprising a source line extending perpendicular to the gate line, wherein the source line is formed from a first section of a conductive film, and the position detection line is formed from a second section of the conductive film.

14. The display device according to claim 13, wherein the source line is disposed on a different layer, with respect to the pixel electrode, through an insulating film.

* * * * *